United States Patent
Murakami

(10) Patent No.: US 12,054,072 B2
(45) Date of Patent: Aug. 6, 2024

(54) INFORMATION PROCESSING SYSTEM

(71) Applicant: HONDA MOTOR CO., LTD., Tokyo (JP)

(72) Inventor: Yoshikazu Murakami, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 942 days.

(21) Appl. No.: 17/024,690

(22) Filed: Sep. 17, 2020

(65) Prior Publication Data

US 2021/0078438 A1 Mar. 18, 2021

(30) Foreign Application Priority Data

Sep. 18, 2019 (JP) .................. 2019-169182

(51) Int. Cl.
| | |
|---|---|
| *B60L 58/12* | (2019.01) |
| *B60L 53/66* | (2019.01) |
| *G01C 21/34* | (2006.01) |
| *G06Q 10/10* | (2023.01) |
| *G06Q 30/0283* | (2023.01) |

(Continued)

(52) U.S. Cl.
CPC ............ *B60L 58/12* (2019.02); *B60L 53/665* (2019.02); *G01C 21/3469* (2013.01); *G06Q 10/10* (2013.01); *G06Q 30/0284* (2013.01); *G06Q 50/06* (2013.01); *G07C 5/12* (2013.01); *H01M 8/0432* (2013.01); *H01M 8/04611* (2013.01); *H01M 8/04671* (2013.01); *H01M 8/04992* (2013.01); *G06Q 20/145* (2013.01);

(Continued)

(58) Field of Classification Search
CPC ... B60L 58/12; B60L 53/665; G01C 21/3469; G06Q 10/10; G06Q 30/0284; G06Q 50/06; G07C 5/12; H01M 8/0432; H01M 8/04611; H01M 8/04671; H01M 8/04992
See application file for complete search history.

(56) References Cited

U.S. PATENT DOCUMENTS 10,680,260 B2 * 6/2020 Grundei ............ H01M 8/04231
10,809,733 B2 * 10/2020 Lindemann ............ B60L 53/65
(Continued)

FOREIGN PATENT DOCUMENTS

| CN | 105103168 A | 11/2015 |
|---|---|---|
| CN | 109816418 A | 5/2019 |

(Continued)

OTHER PUBLICATIONS

Office Action issued for counterpart Japanese Application No. 2019-169182, issued by the Japanese Patent Office on Mar. 15, 2022 (drafted on Mar. 7, 2022).

(Continued)

*Primary Examiner* — Andrew Joseph Rudy

(57) ABSTRACT

An information processing system comprises a requirement specification acquisition unit for acquiring requirement specification information indicative of a content of a requirement specification relating to a fuel cell; and a fee plan determination unit for determining a fee plan for determining a usage fee of the fuel cell, based on the requirement specification indicated by the requirement specification information. The fee plan may include information indicative of a correspondence between a degree of operation of the fuel cell and the usage fee of the fuel cell.

13 Claims, 9 Drawing Sheets

(51) Int. Cl.
  *G06Q 50/06* (2012.01)
  *G07C 5/12* (2006.01)
  *H01M 8/0432* (2016.01)
  *H01M 8/04537* (2016.01)
  *H01M 8/04664* (2016.01)
  *H01M 8/04992* (2016.01)
  *G06Q 20/14* (2012.01)
  *G06Q 30/018* (2023.01)
  *G06Q 30/0645* (2023.01)

(52) U.S. Cl.
  CPC ....... *G06Q 30/018* (2013.01); *G06Q 30/0645* (2013.01); *H01M 2250/20* (2013.01)

(56) References Cited

U.S. PATENT DOCUMENTS

| | | | |
|---|---|---|---|
| 11,067,403 B2 * | 7/2021 | Lindemann | B60W 50/0098 |
| 11,525,866 B2 * | 12/2022 | Matsumura | H01M 10/4221 |
| 11,560,234 B2 * | 1/2023 | Morrison | H01M 8/04074 |
| 11,817,604 B2 * | 11/2023 | Chen | H01M 8/04671 |
| 2007/0084523 A1 | 4/2007 | McLean | |
| 2011/0050239 A1 | 3/2011 | Hoshino | |
| 2012/0068715 A1 | 3/2012 | Martaeng | |
| 2013/0246214 A1 | 9/2013 | Matsuyama | |
| 2018/0134171 A1 * | 5/2018 | Hyde | B60L 3/12 |
| 2018/0304759 A1 * | 10/2018 | Chase | B60L 53/126 |
| 2019/0004487 A1 * | 1/2019 | Yuzawa | G05B 15/02 |
| 2019/0156408 A1 | 5/2019 | Igata | |
| 2020/0132774 A1 | 4/2020 | Hara | |
| 2021/0063181 A1 * | 3/2021 | Saleh | G01C 21/3446 |
| 2023/0093297 A1 * | 3/2023 | Ellice-Flint | H02J 3/381 |
| 2023/0225253 A1 * | 7/2023 | Liu | A01D 34/64 56/11.9 |

FOREIGN PATENT DOCUMENTS

| | | |
|---|---|---|
| JP | 2002184417 A | 6/2002 |
| JP | 2003248764 A | 9/2003 |
| JP | 2007242296 A | 9/2007 |
| JP | 2009509302 A | 3/2009 |
| JP | 2010244492 A | 10/2010 |
| JP | 2011103211 A | 5/2011 |
| JP | 2012091106 A | 5/2012 |
| JP | 2012527726 A | 11/2012 |
| JP | 2013058493 A | 3/2013 |
| JP | 2013084199 A | 5/2013 |
| JP | 2013187178 A | 9/2013 |
| JP | 2014026889 A | 2/2014 |
| JP | 2014123393 A | 7/2014 |
| JP | 2015191701 A | 11/2015 |
| JP | 2017182895 A | 10/2017 |
| JP | 2018085861 A | 5/2018 |
| JP | 2018133035 A | 8/2018 |
| JP | 2019518318 A | 6/2019 |
| WO | 2016075770 A1 | 5/2016 |
| WO | 2017130280 A1 | 8/2017 |
| WO | 2018078875 A1 | 5/2018 |
| WO | 2019016998 A1 | 1/2019 |

OTHER PUBLICATIONS

Office Action issued for counterpart Japanese Application No. 2019-169182, issued by the Japanese Patent Office on Sep. 13, 2022 (drafted on Sep. 9, 2022).

Office Action issued for counterpart Chinese Application 202010787283.4, issued by The State Intellectual Property Office of People's Republic of China on Sep. 15, 2023.

* cited by examiner

INFORMATION PROCESSING SYSTEM

The contents of the following Japanese patent application are incorporated herein by reference:
NO. 2019-169182 filed in JP on Sep. 18, 2019.

BACKGROUND

1. Technical Field

The present invention relates to an information processing system.

2. Related Art

Patent Document 1 discloses that a specification of a battery of a hybrid drive device having a fuel cell and the battery is determined based on uses of the hybrid drive device. Patent Documents 2 and 3 disclose that a specification of a fuel cell is determined based on an actual electric power demand. Also, Patent Document 4 discloses that an operating mode of a fuel cell is changed to reduce an operating cost according to an operation situation of the fuel cell.

CITATION LIST

Patent Document

Patent Document 1: Japanese Patent Application Publication No. 2012-527726
Patent Document 2: WO2016/075770
Patent Document 3: Japanese Patent Application Publication No. 2018-133035
Patent Document 4: Japanese Patent Application Publication No. 2014-026889

DESCRIPTION OF EXEMPLARY EMBODIMENTS

Figure 1:
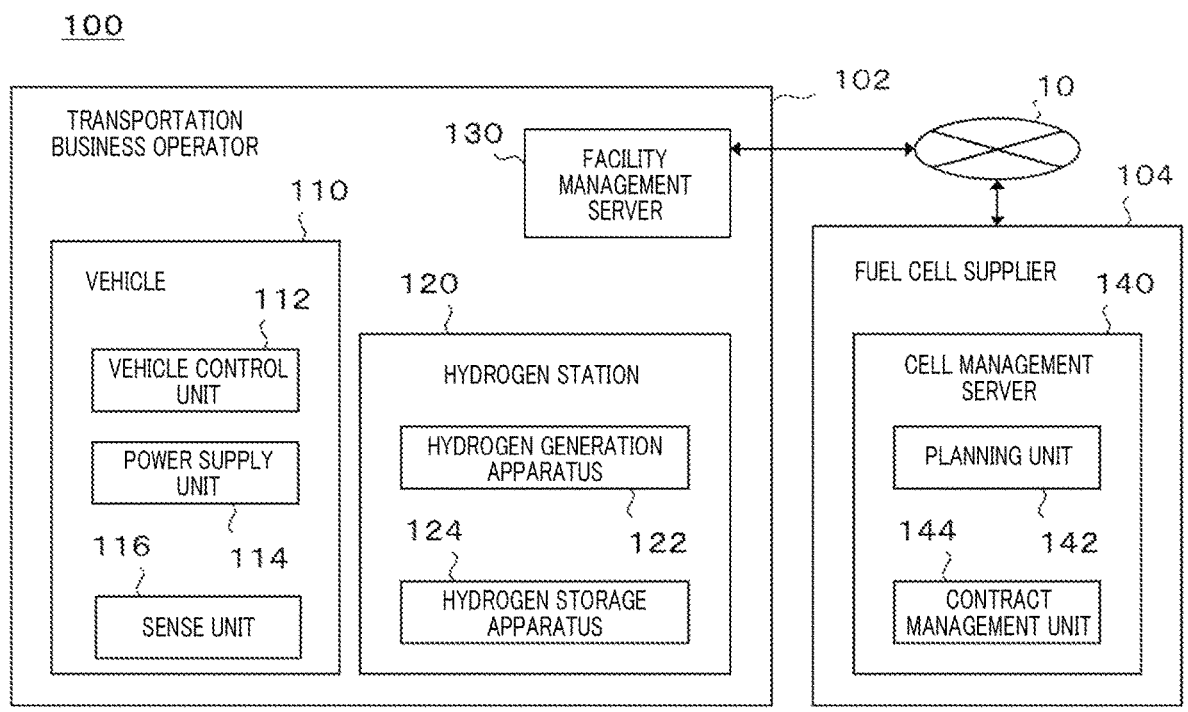
FIG. 1 shows schematically an example of a system configuration of a management system 100.

Hereinafter, the present invention will be described through embodiments of the invention. However, the following embodiments do not limit the invention defined in the claims. Also, all combinations of features described in the embodiments are not necessarily essential to solutions of the invention. In the drawings, the same or similar parts are denoted with the same reference signs, and the overlapping descriptions thereof are omitted in some cases.

[Outline of Management System 100]

FIG. 1 shows schematically an example of a system configuration of a management system 100. In the embodiment shown in FIG. 1, a transportation business operator 102 manages a transportation business by using one or a plurality of (also referred to as one or more) vehicles 110, one or more hydrogen stations 120, and a facility management server 130. In the present embodiment, the vehicles 110 and the hydrogen stations 120 may each transmit and receive information to and from the facility management server 130.

In the present embodiment, a fuel cell supplier 104 supplies one or more fuel cells to the transportation business operator 102. In the present embodiment, a contract (which may also be referred to as a use contract) for supply or use of the fuel cell is concluded between the transportation business operator 102 and the fuel cell supplier 104.

In one embodiment, the use contract defines conditions for the fuel cell supplier 104 to supply the fuel cell to the transportation business operator 102. In another embodiment, the use contract defines conditions for the fuel cell supplier 104 to permit the transportation business operator 102 to use the fuel cell. The conditions may include a condition relating to at least one of a specification of the fuel cell, a use aspect of the fuel cell, a use period of the fuel cell, and a usage fee of the fuel cell. As the condition relating to the usage fee, information indicative of at least one of a type and a content of a selected fee plan, information indicative of items included in a usage fee defined by the selected fee plan, information indicative of items not included in the usage fee defined by the selected fee plan, and the like are exemplified.

For example, the fuel cell supplier 104 supplies the fuel cell to the transportation business operator 102 according to the conditions defined by the use contract. For example, the fuel cell supplier 104 permits the transportation business operator 102 to use the fuel cell according to the conditions defined by the use contract. For example, the transportation business operator 102 pays for the supply of the fuel cell by the fuel cell supplier 104 or the use of the fuel cell by the transportation business operator 102 according to the conditions defined by the use contract.

As the use contract, a lease contract, a lend-lease contract and the like are exemplified. For example, a lease contract or a lend-lease contract on the fuel cell is concluded between the transportation business operator 102 and the fuel cell supplier 104, so that the fuel cell supplier 104 receives the usage fee of the fuel cell from the transportation business operator 102, based on the lease contract or the lend-lease contract. Also, when the lease contract or the lend-lease contract terminates, the fuel cell supplier 104 collects the fuel cell from the transportation business operator 102.

In the present embodiment, the fuel cell supplier 104 determines a specification of the fuel cell that is supplied to the transportation business operator 102 by using a cell management server 140. Also, the fuel cell supplier 104 determines a fee plan for the fuel cell that is supplied to the transportation business operator 102 by using the cell management server 140.

The fee plan is used so as to determine a usage fee of the fuel cell between the transportation business operator 102 and the fuel cell supplier 104. The fee plan may include information indicative of a correspondence between a degree of operation of the fuel cell and the usage fee of the fuel cell.

As an index indicative of the degree of operation of the fuel cell, an amount that varies depending on use of the fuel cell, an amount that varies depending on operation of the fuel cell, an amount that varies depending on deterioration in fuel cell, and the like may be used. As an index indicative of the degree of operation of the fuel cell, (i) an elapse time[h] from a specific time, (ii) a cumulative value of time[h] during which the fuel cell outputs or generates electric power, in a specific period, (iii) a cumulative value of an amount of electric power[kWh] that is output or generated by the fuel cell, in the specific period, (iv) a cumulative value of operation time[h] of an electric device on which the fuel cell is mounted, in the specific period, (v) the number of operation times of the fuel cell in the specific period, (vi) a cumulative value of a moving distance[km] of a moving body on which the fuel cell is mounted, in the specific period, (vii) an amount of change in an index indicative of deterioration in fuel cell, in the specific period, (viii) an amount of change in residual value[¥] of the fuel cell, in the specific period, and the like are exemplified.

As the specific time, a time at which delivery of the fuel cell is completed, a time at which the fuel cell is mounted on an electric device, an operation start time or use start time of the electric device on which the fuel cell is mounted, a time defined in the use contract, and the like are exemplified. A smallest unit of time may be one second, one minute, one hour, one day, one week or one month. As the specific period, a unit period relating to calculation of the usage fee (which may also be referred to as a fee calculation period), a period defined in the use contract, and the like are exemplified.

As the fee plan, (i) a flat fee system, (ii) a measured fee system, (iii) a combination of the flat fee system and the measured fee system, and the like are exemplified. In a fee plan of the flat fee system, the usage fee of the fuel cell is set as a constant value, irrespective of the degree of operation of the fuel cell during the fee calculation period. In the fee plan of the flat fee system, when the degree of operation of the fuel cell during the fee calculation period is within a range defined in the use contract, the usage fee of the fuel cell may be set as a constant value, irrespective of the degree of operation of the fuel cell during the fee calculation period. In a fee plan of the measured fee system, the usage fee of the fuel cell is set to vary continuously or stepwise according to the degree of operation of the fuel cell during the fee calculation period. Also in the fee plan of the measured fee system, when the degree of operation of the fuel cell during the fee calculation period is within a range defined in the use contract, the usage fee of the fuel cell may be set to vary continuously or stepwise according to the degree of operation of the fuel cell during the fee calculation period. In the fee plan of the measured fee system, a basic fee may also be set.

[Outline of Each Unit of Management System 100]

As shown in FIG. 1, in the present embodiment, the vehicle 110 includes a vehicle control unit 112, one or more power supply units 114, and one or more sense units 116. In the present embodiment, the hydrogen station 120 includes one or more hydrogen generation apparatuses 122, and one or more hydrogen storage apparatuses 124. In the present embodiment, the cell management server 140 includes a planning unit 142, and a contract management unit 144. In the present embodiment, the facility management server 130 and the cell management server 140 may also transmit and receive information via a communication network 10.

In the present embodiment, the communication network 10 may be a transmission path of wired communication, a transmission path of wireless communication, or a combination of the transmission path of wired communication and the transmission path of wireless communication. The communication network 10 may include a wireless packet communication network, the Internet, a P2P network, a dedicated line, a VPN, an electric power communication line, an Inter-vehicle communication line, a road-to-vehicle communication line, and the like. The communication network 10 may also include (i) a moving body communication network such as a mobile phone network, and (ii) a wireless communication network such as a wireless MAN (for example, WiMAX (registered trademark)), a wireless LAN (for example, WiFi (registered trademark)), a Bluetooth (registered trademark), a ZigBee (registered trademark), NFC (Near Field Communication) and the like.

In the present embodiment, the vehicle 110 moves using electric power. As the vehicle 110, an automobile, an automatic two-wheeled vehicle, an electric train and the like are exemplified. As the automobile, a passenger vehicle, a commercial vehicle, a bus, a truck and the like are exemplified. As the automatic two-wheeled vehicle, (i) a motorcycle, (ii) a three-wheeled motorcycle, (iii) a standing-ride two-wheeled vehicle or three-wheeled vehicle with a power unit such as a Segway (registered trademark), a kickboard (registered trademark) with a power unit, a skateboard with a power unit, and the like and exemplified.

In the present embodiment, the vehicle control unit 112 controls an operation of each unit of the vehicle 110. For example, the vehicle control unit 112 controls drive of the vehicle 110. The vehicle control unit 112 may also control an operation of the power supply unit 114. The vehicle control unit 112 may also manage a state of each unit of the vehicle 110. The vehicle control unit 112 may transmit and receive information to and from the facility management server 130. The vehicle control unit 112 will be described in detail later.

In the present embodiment, the power supply unit 114 supplies electric power to each unit of the vehicle 110. The power supply unit 114 includes a fuel cell provided by the fuel cell supplier 104. In one embodiment, the power supply unit 114 is configured to be detachably mounted to the vehicle 110. For example, the power supply unit 114 is configured so that it can be replaced by a user of the vehicle 110. In another embodiment, the power supply unit 114 may also be fixed to the vehicle 110. For example, the power supply unit 114 is suppressed or prohibited from being replaced by the user of the vehicle 110. Also in this case, the power supply unit 114 may be configured so that it can be replaced by a manufacturer or a seller of the vehicle 110. The power supply unit 114 will be described in detail later.

In the present embodiment, the sense unit 116 acquires information indicative of a state of each unit of the vehicle 110. The sense unit 116 outputs the information indicative of a state of each unit of the vehicle 110 to the vehicle control unit 112. A part of the sense unit 116 may also be disposed inside of the power supply unit 114. As the state of each unit of the vehicle 110, (i) ON/OFF, a temperature, an output electric power, an output voltage, an output current, an amount of power generation, a remaining amount of fuel, and a remaining capacity of a battery of the power supply unit 114, (ii) ON/OFF, a position, a velocity, an acceleration, and a loaded amount of the vehicle 110, and the like are exemplified.

The sense unit 116 may also include a GPS signal receiver and an internal sensor such as a rotary encoder. Thereby, a position of the vehicle 110 can be estimated. Also, information indicative of a moving history of the vehicle 110, information about a degree and a frequency of acceleration or deceleration of the vehicle 110, and the like can be collected or calculated. The sense unit 116 may also include an operation recorder (which may also be referred to as a tachograph). Thereby, the information indicative of a moving history of the vehicle 110, the information about a degree and a frequency of acceleration or deceleration of the vehicle 110, and the like can be collected or calculated.

In the present embodiment, the hydrogen station 120 supplies hydrogen to the vehicle 110. In the present embodiment, the hydrogen generation apparatus 122 generates hydrogen. For example, the hydrogen generation apparatus 122 generates hydrogen by electrolysis of water. In the meantime, the hydrogen generation method is not limited to the electrolysis of water. In another embodiment, the hydrogen generation apparatus 122 generates hydrogen by modifying fuel such as natural gas, hydrocarbon, alcohol and the like.

In the present embodiment, the hydrogen storage apparatus 124 stores hydrogen generated by the hydrogen generation apparatus 122. The hydrogen storage aspect is not particularly limited. As the hydrogen storage aspect, high-pressure hydrogen, liquid hydrogen, absorption to a hydrogen storing alloy, and the like are exemplified.

In the present embodiment, the cell management server 140 manages one or more fuel cells. In one embodiment, the cell management server 140 manages a state of each of one or more fuel cells. For example, the cell management server 140 manages a deterioration state of each of one or more fuel cells. The cell management server 140 may also assist in concluding a contract on each of one or more fuel cells. The cell management server 140 may also manage the contract on each of one or more fuel cells.

In the present embodiment, the planning unit 142 plans a specification of the fuel cell that is provided to the transportation business operator 102, for example. The planning unit 142 may also assist in planning a plan for a specification of the hydrogen station 120. The planning unit 142 may also plan a fee plan for the fuel cell that is provided to the transportation business operator 102. More specifically, the planning unit 142 acquires information indicative of a content of a requirement specification about the fuel cell that is mounted to the vehicle 110, from the facility management server 130, for example. The planning unit 142 determines a fee plan for the fuel cell, based on the requirement specification. The planning unit 142 may also estimate a deterioration characteristic of the fuel cell, based on the requirement specification. The planning unit 142 may determine the fee plan for the fuel cell, based on the estimated deterioration characteristic. The planning unit 142 will be described in detail later.

In the present embodiment, the contract management unit 144 may manage the contract on each of one or more fuel cells. In one embodiment, the contract management unit 144 manages a content of the contract on each of one or more fuel cells. In another embodiment, the contract management unit 144 manages fulfillment of the contract on each of one or more fuel cells. The contract management unit 144 will be described in detail later.

[Specific Configuration of Each Unit of Management System 100]

The respective units of the management system 100 may be implemented by hardware, software or hardware and software. At least some of the respective units of the management system 100 may be implemented by a single server or a plurality of servers. At least some of the respective units of the management system 100 may be implemented on a virtual machine or a cloud system. At least some of the respective units of the management system 100 may be implemented by a personal computer or a mobile terminal. As the mobile terminal, a mobile phone, a smart phone, a PDA, a tablet, a laptop computer, a wearable computer and the like are exemplified. The respective units of the management system 100 may store information by using a distributed ledger technology such as a block chain or a distributed network.

In a case in which at least some of the constitutional elements configuring the management system 100 are implemented by software, the constitutional element to be implemented by the software may be implemented by activating a program, in which operations relating to the constitutional element are prescribed, in an information processing device having a general configuration. The information processing device includes, for example, (i) a data processing device including a processor such as a CPU, a GPU and the like, a ROM, a RAM, a communication interface, and the like, (ii) an input device such as a keyboard, a touch panel, a camera, a microphone, various types of sensors, a GPS receiver, and the like, (iii) an output device such as a display device, a speaker, a vibration device and the like, and (iv) a storage device (including an external storage device) such as a memory, an HDD and the like.

In the information processing device, the data processing device or storage device may store a program. The program may also be stored in a non-transient computer-readable recording medium. The program is executed by the processor, thereby causing the information processing device to execute the operations prescribed by the program.

The program may also be stored in a non-transient computer-readable recording medium. The program may also be stored in a computer-readable medium such as a CD-ROM, a DVD-ROM, a memory, a hard disk and the like, or may be stored in a storage device connected to a network. The program may also be installed into a computer configuring at least some of the management system 100 from a computer-readable medium or a storage device connected to a network. The program may be executed to cause the computer to function as at least some of the respective units of the management system 100.

The program for causing the computer to function as at least some of the respective units of the management system 100 may have a module in which operations of the respective units of the management system 100 are prescribed. The program or the module activates the data processing device, the input device, the output device, the storage device and the like to cause the computer to function as the respective units of the management system 100 or to cause the computer to execute an information processing method in the respective units of the management system 100.

The information processing described in the program functions as a specific means in which software relating to the program and various types of hardware resources arranged in the respective units of the management system 100 cooperate with each other, as the program is read into the computer. The specific means implements calculation or processing of information according to a use purpose of the computer of the present embodiment, so that the management system 100 is established according to the use purpose.

The program may also be a program for causing the computer to function as the cell management server 140. The program may also be a program for causing the computer to execute an information processing method in the cell management server 140.

The information processing method includes, for example, a requirement specification acquisition step of acquiring requirement specification information indicative of a content of the requirement specification about the fuel cell. The information processing method includes, for example, a fee plan determination step of determining a fee plan for determining a usage fee of the fuel cell, based on the requirement specification indicated by the requirement specification information.

The management system 100 may also be an example of the information processing system. The vehicle 110 may also be an example of the electric device. The vehicle 110 may also be an example of the moving body. The sense unit 116 may also be an example of an operation recording device and a position estimation device. The cell management server 140 may also be an example of the information processing system. The planning unit 142 may also be an example of the information processing system. The contract management unit 144 may also be an example of the state acquisition unit, the deterioration evaluation unit, the first change unit, the second change unit, the limit unit and the expansion unit.

In the present embodiment, the management system 100 has been described in detail with reference to the case where the vehicle 110 is an example of the electric device. However, the electric device is not limited to the vehicle 110. The electric device may be any device that operates using electric power generated by the fuel cell, and a type thereof is not particularly limited. The electric device may also be a device that has the fuel cell mounted thereto and operates using electric power generated by the fuel cell. The fuel cell may be configured to be detachably mounted to the electric device.

The specific examples of the electric device include a transportation device for transporting persons or objects, a fluid transportation device for transporting liquid or gas, a cleaning device, an air conditioning device, an illumination device, a robot, and the like. As the transportation device, a moving body, a heavy machine, an agricultural work machine, a snow remover, an elevator, an escalator, and the like are exemplified. As the moving body, a vehicle, a ship, a flying object and the like may be exemplified. As the ship, a boat, a hovercraft, a watercraft, a submarine, a submersible, an underwater scooter, and the like may be exemplified. As the flying object, an airplane, an airship or balloon, an air balloon, a helicopter, a drone and the like may be exemplified. As the fluid transportation device, a pump, a blower, a sprayer, a washing device, and the like are exemplified. As the cleaning device, a vacuum cleaner, a washing machine, and the like are exemplified.

The electric device may also be a generator that has the fuel cell mounted thereto and outputs electric power generated by the fuel cell to an outside. The generator may also be a portable generator or a stationary generator. The fuel cell may be configured to be detachably mounted to the generator.

In the present embodiment, the hydrogen station 120 has been described in detail with reference to the case where the hydrogen station 120 includes the one or more hydrogen generation apparatuses 122 and the one or more hydrogen storage apparatuses 124. However, the hydrogen station 120 is not limited to the present embodiment. In another embodiment, the hydrogen station 120 may include one of the one or more hydrogen generation apparatuses 122 or the one or more hydrogen storage apparatuses 124.

Figure 2:
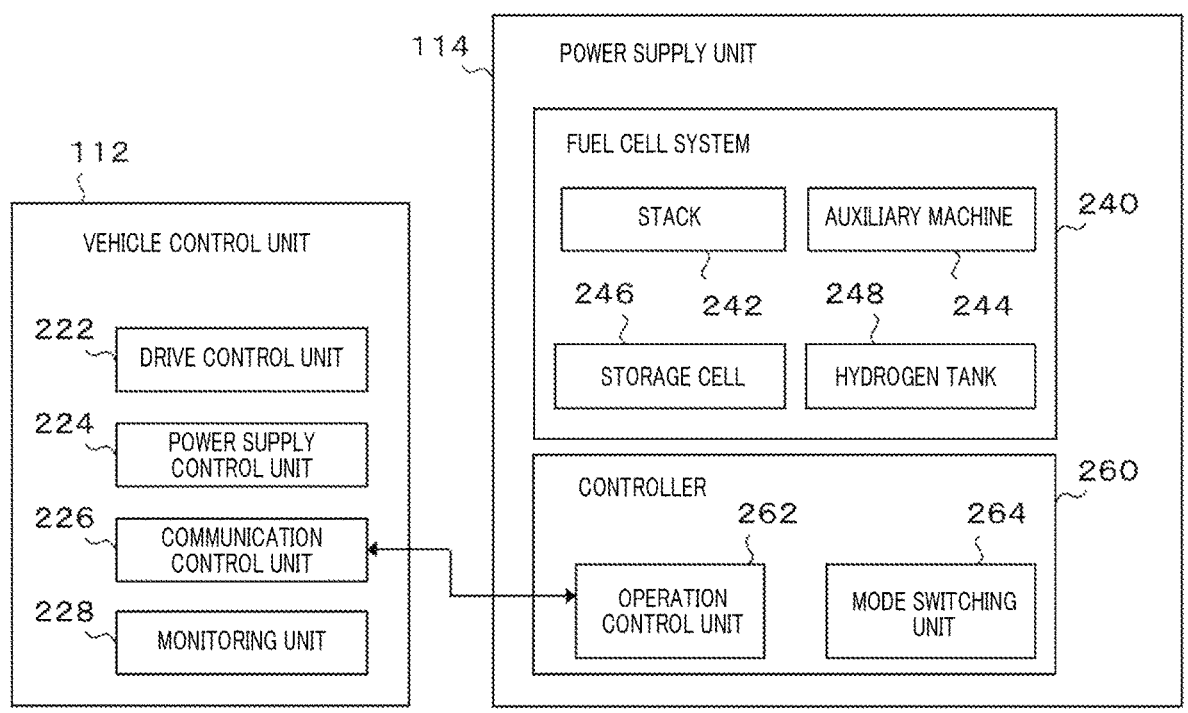
FIG. 2 shows schematically an example of an internal configuration of a vehicle control unit 112 and a power supply unit 114.

FIG. 2 shows schematically an example of an internal configuration of the vehicle control unit 112 and the power supply unit 114. As shown in FIG. 2, in the present embodiment, the vehicle control unit 112 includes a drive control unit 222, a power supply control unit 224, a communication control unit 226, and a monitoring unit 228. Also, in the present embodiment, the power supply unit 114 includes a fuel cell system 240, and a controller 260. The fuel cell system 240 includes, for example, a stack 242, an auxiliary machine 244, a storage cell 246, and a hydrogen tank 248. The controller 260 includes, for example, an operation control unit 262, and a mode switching unit 264.

In the present embodiment, the drive control unit 222 controls moving of the vehicle 110. The power supply control unit 224 regulates an output of the power supply unit 114. For example, electric power, voltage, current, output rate and the like of the power supply unit 114 are regulated. In one embodiment, the power supply control unit 224 may limit an output range of the power supply unit 114 or release the limit. In another embodiment, the power supply control unit 224 may also expand the output range of the power supply unit 114. In yet another embodiment, the power supply control unit 224 may also regulate an upper limit value of the output rate of the power supply unit 114.

In the present embodiment, the communication control unit 226 controls communication between the vehicle control unit 112 and the power supply unit 114 and sense unit 116. The communication control unit 226 may also control communication between the vehicle control unit 112 and the facility management server 130. The monitoring unit 228 acquires information indicative of a state of the vehicle 110 from each of one or more sense units 116. The monitoring unit 228 may transmit the information indicative of the state of the vehicle 110 to the facility management server 130.

In the present embodiment, the fuel cell system 240 outputs electric power. The fuel cell system 240 outputs the electric power, in response to an instruction of the controller 260, for example. The fuel cell system 240 may output electric power generated by the stack 242, electric power accumulated in the storage cell 246 or electric power generated by the stack 242 and electric power accumulated in the storage cell 246, in response to an instruction of the controller 260.

In one embodiment, the fuel cell system 240 is configured to be detachably mounted to the power supply unit 114. For example, the fuel cell system 240 is configured so that it can be replaced by a user of the vehicle 110. In another embodiment, the fuel cell system 240 may be fixed to the power supply unit 114. For example, the fuel cell system 240 is suppressed or prohibited from being replaced by the user of the vehicle 110. Also in this case, the fuel cell system 240 may be configured so that it can be replaced by a manufacturer or a seller of the vehicle 110.

In the present embodiment, the stack 242 reacts oxygen and hydrogen to generate electricity. The auxiliary machine 244 supplies oxygen and hydrogen to the stack 242. Also, the auxiliary machine 244 discharges water generated in the stack 242 from the stack 242. The storage cell 246 accumulates the power generated by the stack 242. Also, the storage cell 246 discharges the accumulated electric power. The hydrogen tank 248 stores hydrogen.

In the present embodiment, the controller 260 controls an operation of the fuel cell system 240. The controller 260 may also control the operation of the fuel cell system 240, in response to an instruction from the power supply control unit 224.

In the present embodiment, the operation control unit 262 controls operation of the fuel cell system 240. The controller 260 may control operation of the fuel cell system 240, in response to an instruction from the power supply control unit 224. For example, the controller 260 controls an operation of the auxiliary machine 244 to regulate an amount of power generation of the stack 242. The controller 260 may also control an operation of the auxiliary machine 244, depending on an operating mode designated by the mode switching unit 264. The controller 260 may control an operation of a switch (not shown) for controlling an output of the storage cell 246, thereby regulating a charge amount or a discharge amount of the storage cell 246.

In the present embodiment, the mode switching unit 264 switches a setting for the operating mode of the fuel cell system 240. The mode switching unit 264 may also change the setting, in response to an instruction from the power supply control unit 224. As the operating mode of the fuel cell system 240, a usual operating mode, a deterioration suppression mode, a performance evaluation mode and the like are exemplified.

In the usual operating mode, the fuel cell system 240 operates under an operating condition at which electric power of a magnitude instructed from the power supply control unit 224 can be output. In the deterioration suppression mode, the fuel cell system 240 operates under an operating condition at which progress of deterioration in the stack 242 and the storage cell 246 is suppressed as compared to the usual operating mode. In the performance evaluation mode, the fuel cell system 240 carries out a test for evaluating performance of the fuel cell system 240. As the performance of the fuel cell system 240, power generation performance of the stack 242, power storage performance of the storage cell 246, and the like are exemplified.

Figure 3:
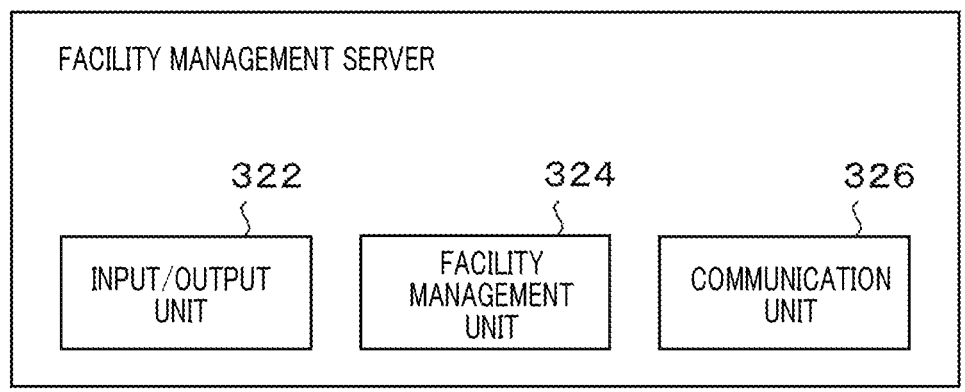
FIG. 3 shows schematically an example of an internal configuration of a facility management server 130.

FIG. 3 shows schematically an example of an internal configuration of the facility management server 130. In the present embodiment, the facility management server 130 includes an input/output unit 322, a facility management unit 324, and a communication unit 326.

In the present embodiment, the input/output unit 322 functions as an interface between the transportation business operator 102 and the facility management server 130. For example, the input/output unit 322 receives an input from the transportation business operator 102. The information input aspect is not particularly limited. The variety of information may be input to the input/output unit 322 via an input device (not shown) such as a keyboard, a pointing device, a microphone, a camera and the like, may be input to the input/output unit 322 via a storage medium (not shown) or may be input to the input/output unit 322 via the communication network 10. The input/output unit 322 may output information to the transportation business operator 102. The information output aspect is not particularly limited. The variety of information may be presented to the transportation business operator 102, as an image, or may be presented to the transportation business operator 102, as a voice.

The transportation business operator 102 inputs information (which may also be referred to as specification information) about a specification (which may also be referred to as a requirement specification) required for the fuel cell that is mounted to the vehicle 110, for example, to the facility management server 130 via the input/output unit 322. The specification information may also be information indicative of a content of the requirement specification. The specification information may include information about at least one selected from a group consisting of (i) a dimension, a shape, a mass, a rated output, a rated voltage, a rated current, a rated output rate, a highest usable temperature and a lowest usable temperature of the fuel cell, (ii) a service life and a use aspect of the fuel cell, and (iii) a use, a type, a rated power consumption, a service life and a use aspect of the vehicle 110.

As the use aspect of the fuel cell, a statistical value about a use time per unit period, a statistical value about an on-off frequency per unit period, a statistical value about a frequency of outputting electric power of a certain value or greater for a unit period, a statistical value about a length of a period in which electric power of a certain value or greater is output for a unit period, and the like are exemplified. As the use aspect of the vehicle 110, a statistical value about power consumption[W], a statistical value about an amount of power consumption[kWh] for a unit period, a statistical value about an on-off frequency per unit period, a statistical value about a rapid acceleration or rapid deceleration frequency per unit period, and the like are exemplified. As the statistical value, at least one of a maximum value, a minimum value, an average value, a medium value and a mode value is exemplified.

The transportation business operator 102 may input information (which may also be referred to as route information) indicative of a content of a plan for a traveling route of the vehicle 110. In one embodiment, the route information may also be information indicative of a geographical position of a route scheduled as the traveling route of the vehicle 110. For example, in a case where the vehicle 110 is a shuttle bus that runs along a predetermined route in a region, a long-distance bus that runs on a route connecting a plurality of relatively distance regions, a long-distance truck that transports goods between logistics bases, or the like, the vehicle 110 travels on a pre-scheduled route. In this case, for example, information indicative of a position of the route is input as the route information.

In another embodiment, the route information may also include at least one of (i) output data of an operation recording device mounted on another vehicle having actually traveled on the route scheduled as the traveling route of the vehicle 110 and (ii) output data of a position estimation device mounted on the another vehicle. As the another vehicle, a gasoline vehicle, an electric automobile and a fuel cell vehicle may be exemplified.

In the present embodiment, the facility management unit 324 manages one or more vehicles 110. For example, the facility management unit 324 manages a current position of each of one or more vehicles 110. The facility management unit 324 may also manage a state of each unit of each of one or more vehicles 110. For example, the facility management unit 324 may manage a remaining amount of hydrogen in each of one or more vehicles 110. The facility management unit 324 may also manage one or more hydrogen stations 120. For example, the facility management unit 324 manages amounts of hydrogen generation of one or more hydrogen stations 120. The facility management unit 324 may also manage amounts of hydrogen storage in one or more hydrogen stations 120. The facility management unit 324 may also manage uses or reservations of one or more hydrogen stations 120.

In the present embodiment, the communication unit 326 performs transmission and reception of information between the facility management server 130 and at least one of the vehicle 110 and the hydrogen station 120. The communication unit 326 may also perform transmission and reception of information between the facility management server 130 and the cell management server 140.

The specification information may be an example of the requirement specification information. The route information may be an example of the moving route information.

Another vehicle having actually traveled on the route scheduled as the traveling route of the vehicle 110 may be an example of the moving body having actually moved on the moving route.

Figure 4:
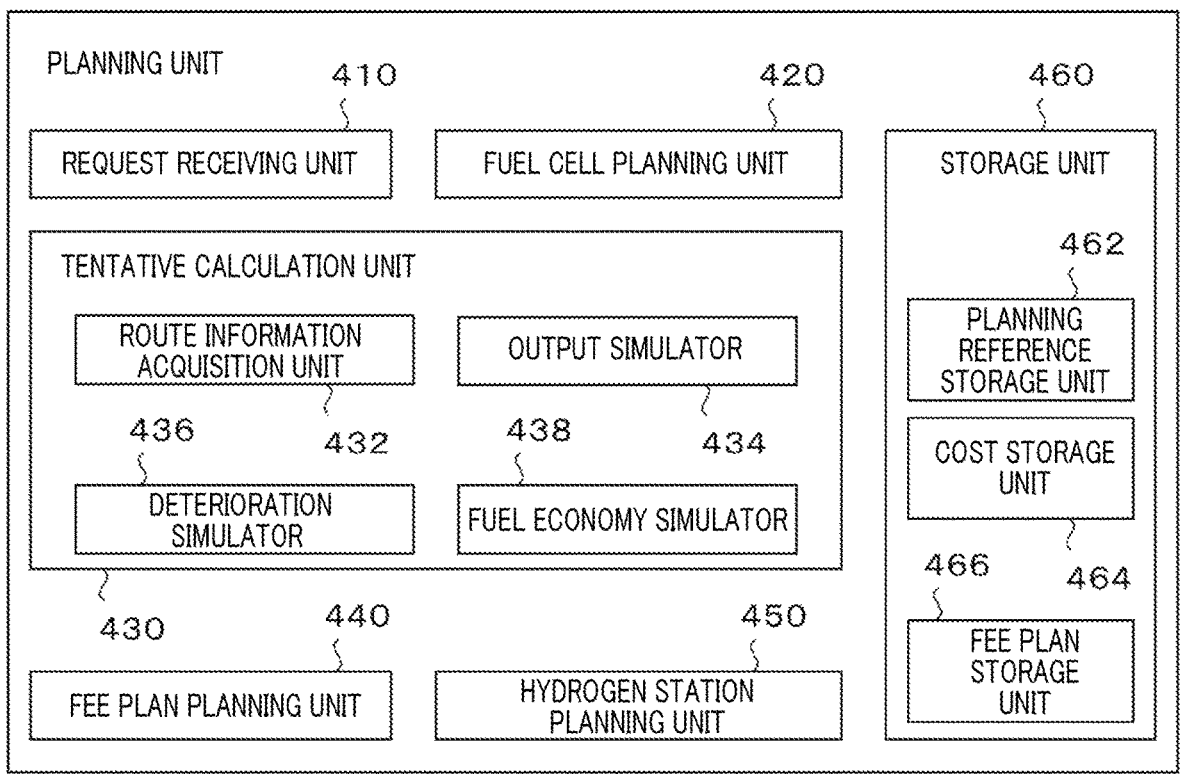
FIG. 4 shows schematically an example of an internal configuration of a planning unit 142.

FIG. 4 shows schematically an example of an internal configuration of the planning unit 142. In the present embodiment, the planning unit 142 incudes a request receiving unit 410, a fuel cell planning unit 420, a tentative calculation unit 430, a fee plan planning unit 440, a hydrogen station planning unit 450, and a storage unit 460. The tentative calculation unit 430 includes, for example, a route information acquisition unit 432, an output simulator 434, a deterioration simulator 436, and a fuel economy simulator 438. The storage unit 460 includes, for example, a planning reference storage unit 462, a fee plan storage unit 466, and a cost storage unit 464.

In the present embodiment, the request receiving unit 410 acquires, from the facility management server 130, for example, the specification information indicative of a content of the requirement specification about the fuel cell system 240 mounted on the vehicle 110. The request receiving unit 410 outputs the acquired specification information to at least one of the fuel cell planning unit 420, the tentative calculation unit 430, the fee plan planning unit 440 and the hydrogen station planning unit 450, for example. As described above, the specification information may also include the variety of information about the vehicle 110 or the fuel cell system 240. The request receiving unit 410 may also receive a variety of instructions or requests from the fuel cell supplier 104.

The specification information preferably includes information indicative of a condition required for the service life of the fuel cell system 240. As the condition, information indicative of a lower limit of the service life, information indicative of power generation performance or output performance at the lower limit of the service life, and the like are exemplified. Thereby, the specification and the fee plan for the fuel cell system 240 can be determined more appropriately.

The specification information may also include information indicative of a use of the vehicle 110. As the use, a private use, a commercial use, a logistics use, a route bus, a long-distance bus, a long-distance truck, and the like are exemplified. Thereby, the specifications and the fee plan for the fuel cell system 240 can be determined more appropriately. Also, an input of the transportation business operator 102 can be simplified.

The specification information may include information indicative of a type of the vehicle 110. As the type, a motorcycle, a small passenger car, a large passenger car, a large bus, a small bus, a large truck, a small truck, and the like are exemplified. Thereby, the specifications and the fee plan for the fuel cell system 240 can be determined more appropriately. Also, an input of the transportation business operator 102 can be simplified.

The specification information may also include information indicative of at least one of a statistical value about a loaded amount of the vehicle 110 and a mass of the vehicle 110. As the statistical value, at least one of a maximum value, a minimum value, an average value, a medium value, a mode value is exemplified. Thereby, a rated output and an output rate required for the fuel cell system 240 can be determined more correctly. As a result, the specification and the fee plan for the fuel cell system 240 can be determined more appropriately.

In the present embodiment, the fuel cell planning unit 420 determines the specification of the fuel cell system 240. The fuel cell planning unit 420 outputs the information indicative of the determined specification of the fuel cell system 240 to at least one of the tentative calculation unit 430, the fee plan planning unit 440 and the hydrogen station planning unit 450, for example.

In the present embodiment, the fuel cell planning unit 420 determines the specification of the fuel cell system 240 so as to satisfy the requirement specification indicated by the specification information acquired by the request receiving unit 410. The fuel cell planning unit 420 may also determine a plurality of options for the specification of the fuel cell system 240.

The fuel cell planning unit 420 may also determine the specification of each unit of the fuel cell system 240, according to a reference stored in the planning reference storage unit 462. The reference may also be information in which a parameter to be input and details of the specification of the fuel cell system 240 are associated with each other, or a learned model. The fuel cell planning unit 420 may also calculate a manufacturing cost of the fuel cell system 240 with reference to a prime cost of each unit of the fuel cell system 240 stored in the cost storage unit 464.

According to one embodiment, the planning reference storage unit 462 stores, as a planning reference, information in which a use of the vehicle 110 and the specification of the fuel cell system 240 suitable for the use are associated with each other. The planning reference storage unit 462 may also store, as the planning reference, a learned model that, when a use of the vehicle 110 is input, outputs the specification of the fuel cell system 240 suitable for the use. In this case, the fuel cell planning unit 420 may determine the specification of the fuel cell system 240, based on the information indicative of the use of the vehicle 110 included in the specification information.

According to another embodiment, the planning reference storage unit 462 stores, as the planning reference, information in which the type of the vehicle 110 and the specification of the fuel cell system 240 suitable for the type are associated with each other. The planning reference storage unit 462 may also store, as the planning reference, a learned model that, when a type of the vehicle 110 is input, outputs the specification of the fuel cell system 240 suitable for the type. In this case, the fuel cell planning unit 420 may determine the specification of the fuel cell system 240, based on the information indicative of the type of the vehicle 110 included in the specification information.

In the present embodiment, the tentative calculation unit 430 estimates a deterioration characteristic and a fuel economy characteristic of the fuel cell system 240 whose specification is determined by the fuel cell planning unit 420. The deterioration characteristic indicates a correspondence between a degree of operation of the fuel cell system 240 and deterioration in the fuel cell system 240. The fuel economy characteristic indicates a correspondence between an output of the fuel cell system 240 and a fuel economy of the fuel cell system 240.

More specifically, the tentative calculation unit 430 first estimates an output variation of the fuel cell system 240 whose specification is determined by the fuel cell planning unit 420. The tentative calculation unit 430 estimates the deterioration characteristic of the fuel cell system 240, based on the estimated output variation. Also, the tentative calculation unit 430 estimates the fuel economy characteristic of the fuel cell system 240, based on the specification of the fuel cell system 240 determined by the fuel cell planning unit 420. Then, the tentative calculation unit 430 estimates the fuel economy of the fuel cell system 240, based on the estimated output variation and fuel economy characteristic of the fuel cell system 240.

In the present embodiment, the route information acquisition unit 432 acquires the route information of the vehicle 110 from the facility management server 130, for example. The route information acquisition unit 432 outputs the acquired route information to the output simulator 434.

In the present embodiment, the output simulator 434 estimates an output of the fuel cell system 240 at each of one or more positions on the traveling route, based on a content of the plan for the traveling route of the vehicle 110 indicated by the route information. Thereby, the output simulator 434 can estimate an output variation of the fuel cell system 240 on the traveling route.

For example, the output simulator 434 estimates a degree of acceleration, a degree of deceleration, an amount of regenerative energy, and the like of the vehicle 110, based on geographical information such as undulation, curvature, distance and the like of the route. The output simulator 434 may also estimate a degree of acceleration, a degree of deceleration, an amount of regenerative energy, and the like of the vehicle 110, taking into further account traffic information such as a speed limit, a traffic signal provision location, a crosswalk provision location and a location where congestion frequently occurs. The output simulator 434 may also estimate the output variation of the fuel cell system 240, based on estimated values of the degree or frequency of acceleration, the degree or frequency of deceleration, the amount of regenerative energy and the like of the vehicle 110.

The output simulator 434 may also estimate the output variation of the fuel cell system 240 on the traveling route, based on the content of the plan for the traveling route of the vehicle 110 indicated by the route information and at least one of the use and the type of the vehicle 110 included in the specification information. The output simulator 434 may also estimate the output variation of the fuel cell system 240 on the traveling route, based on the content of the plan for the traveling route of the vehicle 110 indicated by the route information, and the statistical value about the loaded amount of the vehicle 110 and the mass of the vehicle 110 included in the specification information.

When the route information includes output data of the operation recording device mounted on another vehicle having actually traveled on the route scheduled as the traveling route of the vehicle 110, the output simulator 434 can estimate the output variation of the fuel cell system 240, taking into account the actual data relating to the degrees or frequencies of acceleration and deceleration of the vehicle 110. Thereby, the estimation accuracy is improved.

Similarly, when the route information includes output data of the position estimation device mounted on the another vehicle, the output simulator 434 may also calculate the degrees or frequencies of acceleration and deceleration of the vehicle 110, based on the time information and position information included in the output data. Thereby, the output simulator 434 can estimate the output variation of the fuel cell system 240, taking into account the actual data relating to the degrees or frequencies of acceleration and deceleration of the vehicle 110.

In the meantime, when altitude information indicative of an altitude for each position is not included in the output data of the position estimation device, the output simulator 434 may also estimate the output variation of the fuel cell system 240 by comparing the output data and map data including the altitude information. Thereby, the estimation accuracy is improved.

Similarly, the output simulator 434 may estimate a temperature of the fuel cell system 240 at one or more positions on the traveling route. Thereby, the output simulator 434 can estimate temperature variation of the fuel cell system 240 on the traveling route.

The output simulator 434 outputs information indicative of the output variation of the fuel cell system 240 at one or more positions on the traveling route to at least one of the deterioration simulator 436 and the fuel economy simulator 438, for example. The output simulator 434 may also output information indicative of the output variation and the temperature variation of the fuel cell system 240 at one or more positions on the traveling route to at least one of the deterioration simulator 436 and the fuel economy simulator 438, for example.

In the present embodiment, the deterioration simulator 436 estimates the deterioration characteristic of the fuel cell system 240, based on the content of the plan for the traveling route of the vehicle 110 indicated by the route information. As described above, the deterioration characteristic indicates the correspondence between the degree of operation of the fuel cell system 240 and the deterioration in the fuel cell system 240. For example, the deterioration simulator 436 estimates at least one of a progress state of deterioration per output electric power amount, a progress state of deterioration per unit period and a progress state of deterioration per one traveling on the traveling route or statistical values thereof.

In one embodiment, the deterioration simulator 436 estimates the deterioration characteristic of the fuel cell system 240, based on the output variation of the fuel cell system 240 estimated by the output simulator 434. More specifically, the deterioration simulator 436 estimates the deterioration characteristic of the fuel cell system 240, based on the estimated value of the output variation of the fuel cell system 240 obtained by the output simulator 434, by using information or learned model indicating a relation between at least one of the output current and the output voltage of the fuel cell system 240 at an assumed fuel cell operating temperature and a progress state of deterioration in the fuel cell system 240.

For example, the deterioration simulator 436 may also analyze the estimated value of the output variation of the fuel cell system 240 obtained by the output simulator 434 to calculate at least one of a frequency where the output current or the output voltage of the fuel cell system 240 becomes larger than a predetermined value and a cumulative value of time for which the output current or the output voltage of the fuel cell system 240 becomes larger than the predetermined value. The deterioration simulator 436 may also estimate the deterioration characteristic of the fuel cell system 240, based on at least one of the frequency and the cumulative value, by using information or learned model indicating a relation between at least one of the frequency and the cumulative value and the progress state of deterioration in the fuel cell system 240.

The deterioration simulator 436 may also estimate the deterioration characteristic of the fuel cell system 240, based on at least one of a magnitude of an output variation amount, a range of the output variation, and a rate of the output variation (which may also be referred to as an output rate) of the fuel cell system 240. The deterioration simulator 436 may also estimate the deterioration characteristic of the fuel cell system 240, based on the output variation of the fuel cell system 240 estimated by the output simulator 434, by using information or learned model indicating a relation between at least one of a magnitude of an output variation amount, a range of the output variation, and a rate of the output variation (which may also be referred to as an output rate) of the fuel cell system 240 and the progress state of deterioration in the fuel cell system 240. The output may be an output electric power, an output voltage or an output current.

In another embodiment, the deterioration simulator 436 estimates the deterioration characteristic of the fuel cell system 240, based on the output variation and the temperature variation of the fuel cell system 240 estimated by the output simulator 434. More specifically, the deterioration simulator 436 estimates the deterioration characteristic of the fuel cell system 240, based on the estimated value of the output variation and the estimated value of the temperature variation of the fuel cell system 240 obtained by the output simulator 434, by using information or learned model indicating a relation among at least one of one or more fuel cell operating temperatures, at least one of the output current and the output voltage of the fuel cell system 240 at each temperature, and the progress state of deterioration in the fuel cell system 240.

For example, the deterioration simulator 436 may also analyze the estimated values of the output variation and the temperature variation of the fuel cell system 240 obtained by the output simulator 434 to calculate at least one of a frequency where the output current or the output voltage of the fuel cell system 240 becomes larger than a predetermined value and a cumulative value of time for which the output current or the output voltage of the fuel cell system 240 becomes larger than the predetermined value. The predetermined value may be a value determined depending on the temperature of the fuel cell system 240. In the meantime, the deterioration simulator 436 may also analyze the estimated values of the output variation and the temperature variation of the fuel cell system 240 obtained by the output simulator 434 to calculate at least one of (i) a frequency where the temperature of the fuel cell system 240 is beyond a predetermined range and the output current or the output voltage of the fuel cell system 240 is larger than a predetermined value and (ii) a cumulative value of time for which the temperature of the fuel cell system 240 is beyond the predetermined range and the output current or the output voltage of the fuel cell system 240 is larger than the predetermined value. The deterioration simulator 436 may also estimate the deterioration characteristic of the fuel cell system 240, based on at least one of the frequency and the cumulative value, by using information or learned model indicating a relation among at least one of the frequency and the cumulative value, the temperature of the fuel cell system 240, and the progress state of deterioration in the fuel cell system 240.

The deterioration simulator 436 may also estimate the deterioration characteristic of the fuel cell system 240, based on at least one of a magnitude of the output variation amount, a range of the output variation, a rate of the output variation (which may also be referred to as an output rate) of the fuel cell system 240. The deterioration simulator 436 may also estimate the deterioration characteristic of the fuel cell system 240, based on the output variation of the fuel cell system 240 estimated by the output simulator 434, by using information or learned model indicating a relation among at least one of a magnitude of the output variation amount, a range of the output variation, and a rate of the output variation (which may also be referred to as an output rate) of the fuel cell system 240, a temperature of the fuel cell system 240, and the progress state of deterioration in the fuel cell system 240. The output may be an output electric power, an output voltage or an output current.

In the present embodiment, the fuel economy simulator 438 estimates the fuel economy of the fuel cell system 240, based on the content of the plan for the traveling route of the vehicle 110 indicated by the route information. As described above, the fuel economy characteristic indicates a correspondence between the output of the fuel cell system 240 and the fuel economy of the fuel cell system 240. For example, the fuel economy simulator 438 estimates at least one of an amount of fuel consumption per output electric power amount, an amount of fuel consumption per unit period, an amount of fuel consumption at the time when the vehicle 110 travels on a unit length, and an amount of fuel consumption at the time when the vehicle 110 travels one time on the traveling route, or statistical values thereof.

In one embodiment, the fuel economy simulator 438 estimates the fuel economy of the fuel cell system 240, based on the output variation of the fuel cell system 240 estimated by the output simulator 434. More specifically, the fuel economy simulator 438 integrates an amount of hydrogen consumption, based on a profile of generated current estimated by the output simulator 434. The fuel economy simulator 438 calculates the fuel economy of the fuel cell system 240, based on the integrated value of the amount of hydrogen consumption. The fuel economy simulator 438 may also calculate the fuel economy, based on the integrated value of the amount of hydrogen consumption at the time when the vehicle 110 travels one time on the traveling route. The fuel economy simulator 438 may also calculate the fuel economy, based on the integrated value of the amount of hydrogen consumption and the definition of the fuel economy to be calculated.

In another embodiment, the fuel economy simulator 438 estimates the fuel economy of the fuel cell system 240, based on the output variation and the temperature variation of the fuel cell system 240 estimated by the output simulator 434. More specifically, the fuel economy simulator 438 integrates the amount of hydrogen consumption, based on profiles of the generated current and temperature estimated by the output simulator 434. The fuel economy simulator 438 calculates the fuel economy of the fuel cell system 240, based on the integrated value of the amount of hydrogen consumption. The fuel economy simulator 438 may also calculate the fuel economy, based on the integrated value of the amount of hydrogen consumption at the time when the vehicle 110 travels one time on the traveling route. The fuel economy simulator 438 may also calculate the fuel economy, based on the integrated value of the amount of hydrogen consumption and the definition of the fuel economy to be calculated.

(Fee Plan for Fuel Cell System 240)

In the present embodiment, the fee plan planning unit 440 determines a fee plan for the fuel cell system 240 mounted on the vehicle 110. The fee plan planning unit 440 may determine the fee plan, based on the requirement specification indicated by the specification information.

In one embodiment, the fee plan planning unit 440 determines the fee plan for the fuel cell system 240, based on the specification of the fuel cell system 240 determined by the fuel cell planning unit 420. For example, the fee plan planning unit 440 determines the fee plan for the fuel cell system 240, taking into account a manufacturing cost of the fuel cell system 240 calculated based on the specification of the fuel cell system 240 by the fuel cell planning unit 420.

The fee plan planning unit 440 may also determine the fee plan for the fuel cell planning unit 420, based on the manufacturing cost of the fuel cell system 240 and the condition required for the service life of the fuel cell system 240 included in the specification information.

In another embodiment, the fee plan planning unit 440 determines the fee plan for the fuel cell planning unit 420, based on the specification of the fuel cell planning unit 420 determined by the fuel cell planning unit 420 and the deterioration characteristic of the fuel cell planning unit 420 estimated by the deterioration simulator 436. More specifically, the fee plan planning unit 440 determines the fee plan for the fuel cell planning unit 420, based on the manufacturing cost of the fuel cell system 240 calculated by the fuel cell planning unit 420 and the progress state of deterioration in fuel cell at the time when the service life of the fuel cell system 240 included in the specification information has elapsed.

More specifically, the fee plan planning unit 440 first sets a lifetime collection fee of the fuel cell system 240. The lifetime collection fee may be a cumulative value of the usage fee of the fuel cell system 240 that occurs during a period (which may also be referred to as a service period) until the service life of the fuel cell system 240 elapses. The lifetime collection fee may also be a cumulative value of the usage fee of the fuel cell system 240 during a single contract period. The lifetime collection fee may also be a cumulative value of the usage fee of the fuel cell system 240 during a plurality of contract periods.

The fee plan planning unit 440 may set the lifetime collection fee of the fuel cell system 240, based on the manufacturing cost of the fuel cell system 240 calculated by the fuel cell planning unit 420. The fee plan planning unit 440 may also set the lifetime collection fee so that the lifetime collection fee of the fuel cell system 240 is greater than the manufacturing cost of the fuel cell system 240. The fee plan planning unit 440 may also set the lifetime collection fee so that the lifetime collection fee of the fuel cell system 240 is greater than a difference between the manufacturing cost of the fuel cell system 240 and a target value of a residual value of the fuel cell system 240 at the time when the service life of the fuel cell system 240 has elapsed.

In one embodiment, the fee plan planning unit 440 sets the lifetime collection fee of the fuel cell system 240, based on the manufacturing cost of the fuel cell system 240 and an instruction from the fuel cell supplier 104 received by the request receiving unit 410. For example, the instruction from the fuel cell supplier 104 includes information indicative of a ratio (A/B) of the manufacturing cost (A) of the fuel cell system 240 to the lifetime collection fee (B) of the fuel cell system 240. The fee plan planning unit 440 may calculate the lifetime collection fee of the fuel cell system 240 by dividing the manufacturing cost of the fuel cell system 240 by the ratio.

In the meantime, when the instruction from the fuel cell supplier 104 includes information indicative of a target value of the lifetime collection fee of the fuel cell system 240, the fee plan planning unit 440 may set the target value, as the lifetime collection fee. Also, when the instruction from the fuel cell supplier 104 includes information indicative of a target value of a profit made by the fuel cell system 240 for the lifetime, the fee plan planning unit 440 may also set the lifetime collection fee, based on the target value and the manufacturing cost of the fuel cell system 240.

In another embodiment, the fee plan planning unit 440 sets the lifetime collection fee of the fuel cell system 240, based on at least a part of the specification information received by the request receiving unit 410 and the instruction from the fuel cell supplier 104 received by the request receiving unit 410. For example, the instruction from the fuel cell supplier 104 includes information indicative of a target value for sales or profit per unit period. Also, for example, the specification information includes information indicative of conditions required for the service life of the fuel cell system 240, and the conditions required for the service life include information indicative of a lower limit value of the service life.

In this case, the fee plan planning unit 440 calculates the lifetime collection fee of the fuel cell system 240 by multiplying the target value for sales and the lower limit value of the service life, for example. The fee plan planning unit 440 may also calculate the lifetime collection fee of the fuel cell system 240 by adding a value obtained by the target value for sales and the lower limit value of the service life and the manufacturing cost of the fuel cell system 240 each other.

In the meantime, the fee plan planning unit 440 may also calculate the lifetime collection fee, taking into account a residual value of the fuel cell system 240 at the time when the service life has elapsed. For example, the fee plan planning unit 440 may also calculate a final lifetime collection fee by subtracting the residual value of the fuel cell system 240 from the lifetime collection fee calculated by the above procedure. The residual value of the fuel cell system 240 is calculated based on the deterioration characteristic of the fuel cell system 240 estimated by the deterioration simulator 436, for example.

Thereby, the fee plan planning unit 440 can appropriately set the usage fee, depending on the situation for each use contract. For example, in a case where the fuel cell system 240 is used under relatively severe conditions, the estimated value of a deterioration amount per unit period is larger, as compared to a case where the fuel cell system 240 is used under mild conditions. As a result, the residual value of the fuel cell system 240 becomes small and the final lifetime collection fee becomes large at the time when the service life has elapsed.

Subsequently, the fee plan planning unit 440 determines a collection fee for each use contract, based on the lifetime collection fee of the fuel cell system 240. The fee plan planning unit 440 may determine the usage fee for each fee calculation period in the flat fee system, based on the collection fee for each use contract. The fee plan planning unit 440 may determine the usage fee in the measured fee system, based on the collection fee for each use contract.

In one embodiment, the collection fee for each use contract is calculated based on a length of the contract period. For example, the collection fee $P_c$ for each use contract may be calculated based on a following equation (1) by using the lifetime collection fee $P_{total}$ of the fuel cell system 240, a length $T_c$ of a contract period, and a length $T_{total}$ of a service period. In the equation (1), $a_1$ and $b_1$ are arbitrary constants. $a_1$ may be a number of 1 or larger. $a_1$ may be 1. $b_1$ may be 0 or a positive integer.

$$P_c = a_1 \times P_{total} \times (T_c \div T_{total}) + b_1 \quad \text{(equation 1)}$$

In another embodiment, the collection fee for each use contract is calculated based on the deterioration characteristic of the fuel cell planning unit 420 estimated by the deterioration simulator 436. For example, the collection fee $P_c$ for each use contract may also be calculated based on a following equation (2) by using the lifetime collection fee $P_{total}$ of the fuel cell system 240, an estimated value $D_c$ of the deterioration amount for a contract period, and an estimated value $D_{total}$ of the deterioration amount for a service period. In the equation (2), $a_2$ and $b_2$ are arbitrary constants. $a_2$ may be a number of 1 or larger. $a_2$ may be 1. $b_2$ may be 0 or a positive integer.

$$P_c = a_2 \times P_{total} \times (D_c \div D_{total}) + b_2 \quad \text{(equation 2)}$$

In the equation (2), the estimated value $D_c$ of the deterioration amount for a contract period is calculated based on the length of the contract period and the deterioration characteristic of the fuel cell planning unit 420 estimated by the deterioration simulator 436. For example, when the deterioration characteristic is an estimated value of the deterioration amount per unit period, the estimated value $D_c$ of the deterioration amount for a contract period is calculated by multiplying the length of the contract period by the deterioration characteristic. Similarly, the estimated value $D_{total}$ of the deterioration amount for a service period is calculated based on the length of the service period and the deterioration characteristic of the fuel cell planning unit 420 estimated by the deterioration simulator 436. For example, when the deterioration characteristic is the estimated value of the deterioration amount per unit period, the estimated value $D_{total}$ of the deterioration amount for a service period is calculated by multiplying the length of service period by the deterioration characteristic.

Subsequently, the fee plan planning unit 440 plans a fee plan. The fee plan planning unit 440 may also plan a plurality of fee plans for a single use contract. As described above, as the fee plan, (i) the flat fee system, (ii) the measured fee system, (iii) the combination of the flat fee system and the measured fee system, and the like are exemplified.

The fee plan planning unit 440 may determine the usage fee for each fee calculation period in the flat fee system, based on the collection fee for each use contract. The fee plan planning unit 440 may also determine the usage fee for each fee calculation period, based on the collection fee $P_c$ for each use contract and a ratio $(T_u/T_c)$ of the length $T_c$ of the contract period and a length $T_u$ of the fee calculation period. The fee plan planning unit 440 may also determine the usage fee for each fee calculation period, based on the collection fee $P_c$ for each use contract, and a ratio $(D_u/D_c)$ of the estimated value $D_c$ of the deterioration amount for a contract period and the estimated value $D_u$ of the deterioration amount for a fee calculation period.

The fee plan planning unit 440 may also determine the usage fee for each fee calculation period in the flat fee system, taking into account a specified degree of the requirement specification designated by the transportation business operator 102. For example, the fee plan planning unit 440 determines the usage fee for each fee calculation period so that the more detailed the requirement specification is specified, the less the usage fee for each fee calculation period is.

The more detailed the requirement specification is specified, the more favorable the estimation accuracy obtained by the output simulator 434 or the estimation accuracy obtained by the deterioration simulator 436 is. Thereby, the accuracy of the profit plan planned by the fee plan planning unit 440 becomes favorable. As a result, it can be assumed that the usage fee is set to an appropriate level or the usage fee is set to a relatively low fee.

Similarly, the fee plan planning unit 440 may also determine the usage fee for each fee calculation period in the flat fee system, taking into account the estimation accuracy obtained by the output simulator 434 or the estimation accuracy obtained by the deterioration simulator 436. For example, the fee plan planning unit 440 determines the usage fee for each fee calculation period so that the more favorable the estimation accuracy obtained by the output simulator 434 or the estimation accuracy obtained by the deterioration simulator 436 is, the less the usage fee for each fee calculation period is.

The fee plan planning unit 440 may also determine a condition for applying the flat fee system. The fee plan planning unit 440 may also determine a content of an incentive for promoting compliance with the condition. The fee plan planning unit 440 may also determine a content of a penalty when the condition is not complied.

The condition for applying the flat fee system may include a condition relating to a use aspect of the fuel cell system 240 by the transportation business operator 102. For example, in an aspect where the deterioration in the fuel cell system 240 is promoted, certain limits are placed on the use of the fuel cell system 240. The condition may include a condition relating to the specified degree of the requirement specification designated by the transportation business operator 102. For example, when the requirement specification is designated in detail to some extent or higher, the flat fee system can be applied. More specifically, when the number of the designated requirement specifications exceeds a threshold value, or when the requirement specification includes the route information, the flat fee system can be applied. The condition may also include a condition relating to the estimation accuracy obtained by the output simulator 434 or the estimation accuracy obtained by the deterioration simulator 436. For example, when the estimation accuracy obtained by the output simulator 434 or the estimation accuracy obtained by the deterioration simulator 436 is more favorable than a predetermined level, the flat fee system can be applied.

The fee plan planning unit 440 may determine a calculation procedure of the usage fee in the measured fee system, based on the collection fee for each use contract. In the fee system of the measured fee system, the usage fee varies depending on the degree of operation of the fuel cell. An index indicative of the degree of operation of the fuel cell may be as described above. The fee plan planning unit 440 may calculate an amount (which may also be referred to as a unit use fee) of the usage fee per unit amount of the index, which is a charging target. For example, the fee plan planning unit 440 determines the usage fee for each fee calculation period, based on the collection fee $P_c$ for each use contract and a ratio $(A_u/A_c)$ of an estimated value $A_c$ of a cumulative amount of an index, which is a charging target during a contract period, and an estimated value $A_u$ of a cumulative amount of an index, which is a charging target during a fee calculation period.

The fee plan planning unit 440 may also determine a fee system in the combination system of the flat fee system and the measured fee system, in a similar manner to the above-described procedure. For example, the fee plan planning unit 440 determines the usage fee for each fee calculation period in a flat fee part, a range in which the flat fee system is applied, and a calculation procedure of the usage fee in the measured fee system. The fee plan planning unit 440 may also determine a condition for applying the flat fee system. The fee plan planning unit 440 may also determine a content of an incentive for promoting compliance with the condition. The fee plan planning unit 440 may also determine a content of a penalty when the condition is not complied.

The fee plan planning unit 440 may also determine a fee plan suitable for a use contract from a plurality of fee plans relating to the use contract. For example, the fee plan planning unit 440 determines whether the variation in the degree of operation of the fuel cell system 240 is greater than a predetermined degree, based on at least one of the requirement specification, the estimation result of the output simulator 434, the estimation result of the deterioration simulator 436 and the estimation result of the fuel economy simulator 438.

When it is determined that the variation in the degree of operation of the fuel cell system 240 is greater than a predetermined degree, the fee plan planning unit 440 may recommend the transportation business operator 102 to adopt the fee system of the measured fee system. On the other hand, when it is determined that the variation in the degree of operation of the fuel cell system 240 is not greater than a predetermined degree, the fee plan planning unit 440 may recommend the transportation business operator 102 to adopt the fee system of the flat fee system.

Thereby, the fuel cell supplier 104 can present the transportation business operator 102 with a plurality of fee plans. Also, the transportation business operator 102 can select a fee plan suitable for a business of the transportation business operator 102 from the plurality of fee plans.

In the meantime, it may be permitted to change the usage fee during the contract period, depending on the use contract. In this case, the fee plan planning unit 440 may determine to change the usage fee during the contract period. For example, the fee plan planning unit 440 monitors the progress state of deterioration in the fuel cell system 240 and estimates at least one of a remaining lifetime and a residual value of the fuel cell system 240, during the contract period. As a result of the estimation, when it is determined that the fuel cell system 240 can be used in excess of the service life designated by the requirement specification, or, when it is determined that the residual value of the fuel cell system 240 is greater than a predetermined value, the fee plan planning unit 440 changes the usage fee so that the usage fee is smaller than a current fee. On the other hand, as a result of the estimation, when it is determined that the fuel cell system 240 cannot be used before the service life designated by the requirement specification, or, when it is determined that the residual value of the fuel cell system 240 is less than the predetermined value, the fee plan planning unit 440 changes the usage fee so that the usage fee is larger than the current fee.

In yet another embodiment, the fee plan storage unit 466 stores information in which a use of the vehicle 110 and a fee plan suitable for the use are associated with each other. In this case, the fee plan planning unit 440 may determine the fee plan for the fuel cell system 240, based on the information indicative of the use of the vehicle 110 included in the specification information.

According to still another embodiment, the planning reference storage unit 462 stores information in which a type of the vehicle 110 and a fee plan suitable for the type are associated with each other. In this case, the fee plan planning unit 440 may determine the fee plan for the fuel cell system 240, based on the information indicative of the type of the vehicle 110 included in the specification information.

(Fee Plan For Hydrogen)

In the present embodiment, the fee plan planning unit 440 may determine a fee plan for a usage fee of hydrogen, separately from the usage fee of the fuel cell system 240. In one embodiment, the fee plan planning unit 440 may determine an upper limit value of hydrogen that can be used within a range of fees decided by the determined fee plan for the fuel cell system 240.

In another embodiment, in the determined fee plan for the fuel cell system 240, when a usage fee of hydrogen is additionally charged according to a used amount of hydrogen, the fee plan planning unit 440 may determine a unit price of hydrogen.

In the present embodiment, the hydrogen station planning unit 450 determines a specification of the hydrogen station 120. As the specification of the hydrogen station 120, a hydrogen generating capability of the hydrogen generation apparatus 122, a hydrogen storing capability of the hydrogen storage apparatus 124, and the like are exemplified.

In one embodiment, the hydrogen station planning unit 450 determines the specification of the hydrogen station 120, based on the specification of the fuel cell planning unit 420 determined by the fuel cell planning unit 420. More specifically, first, the hydrogen station planning unit 450 predicts a demand amount of hydrogen by one or more vehicles 110 using the hydrogen station 120, based on the specification of the fuel cell planning unit 420 determined by the fuel cell planning unit 420. Then, the hydrogen station planning unit 450 determines the specification of the hydrogen station 120, based on the predicted demand amount of hydrogen.

In another embodiment, the hydrogen station planning unit 450 determines the specification of the hydrogen station 120, based on the specification of the fuel cell planning unit 420 determined by the fuel cell planning unit 420 and the fuel economy characteristic of the fuel cell planning unit 420 estimated by the fuel economy simulator 438. More specifically, first, the hydrogen station planning unit 450 predicts a demand amount of hydrogen by one or more vehicles 110, based on the fuel economy characteristic of one or more vehicles 110 using the hydrogen station 120. Then, the hydrogen station planning unit 450 determines the specification of the hydrogen station 120, based on the predicted demand amount of hydrogen.

According to the present embodiment, the specification of the hydrogen station 120 is determined based on the predicted demand of one or more vehicles 110 using the hydrogen station 120. Thereby, it is possible to suppress the manufacturing cost and the running cost of the hydrogen station 120. As a result, the hydrogen station 120 can produce hydrogen at low cost.

In the present embodiment, the storage unit 460 stores a variety of information. The storage unit 460 may also store information that is used in information processing of the planning unit 142. The storage unit 460 may also store information generated in the information processing of the planning unit 142.

In the present embodiment, the planning reference storage unit 462 stores a variety of information about determination references for determining a specification of each unit of the fuel cell system 240. In the present embodiment, the fee plan storage unit 466 stores a variety of information about the fee plan. In the present embodiment, the cost storage unit 464 stores information about a manufacturing prime cost of each unit of the fuel cell system 240.

The request receiving unit 410 may also be an example of the requirement specification acquisition unit. The route information acquisition unit 432 may also be an example of the moving route acquisition unit. The output simulator 434 may also be an example of the output estimation unit. The deterioration simulator 436 may also be an example of the deterioration estimation unit. The fee plan planning unit 440 may also be an example of the fee plan determination unit.

Figure 5:
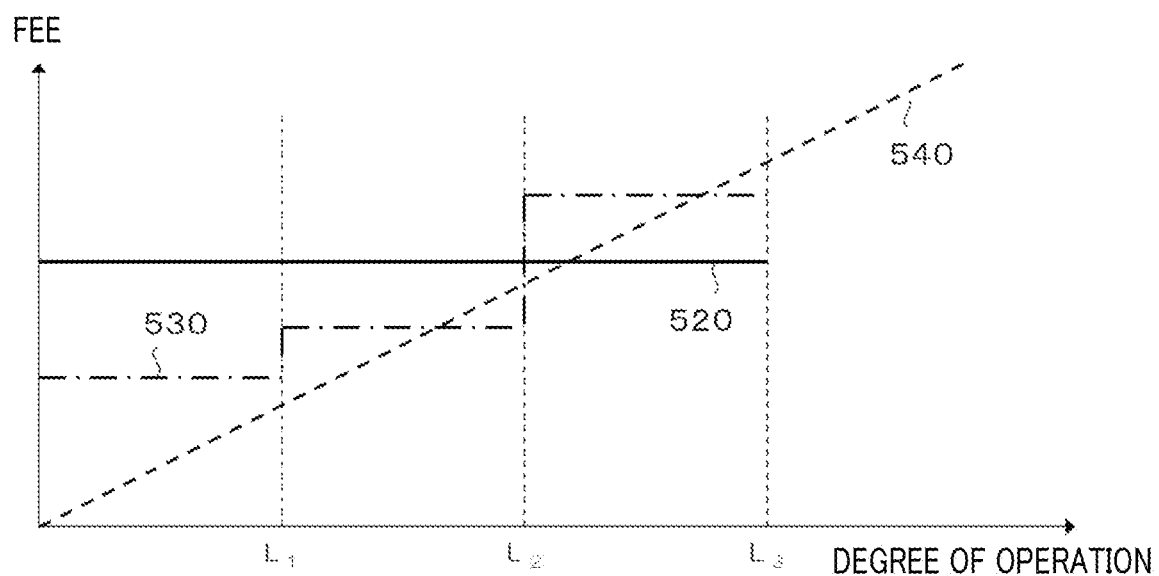
FIG. 5 shows schematically an example of a fee plan.
Figure 6:
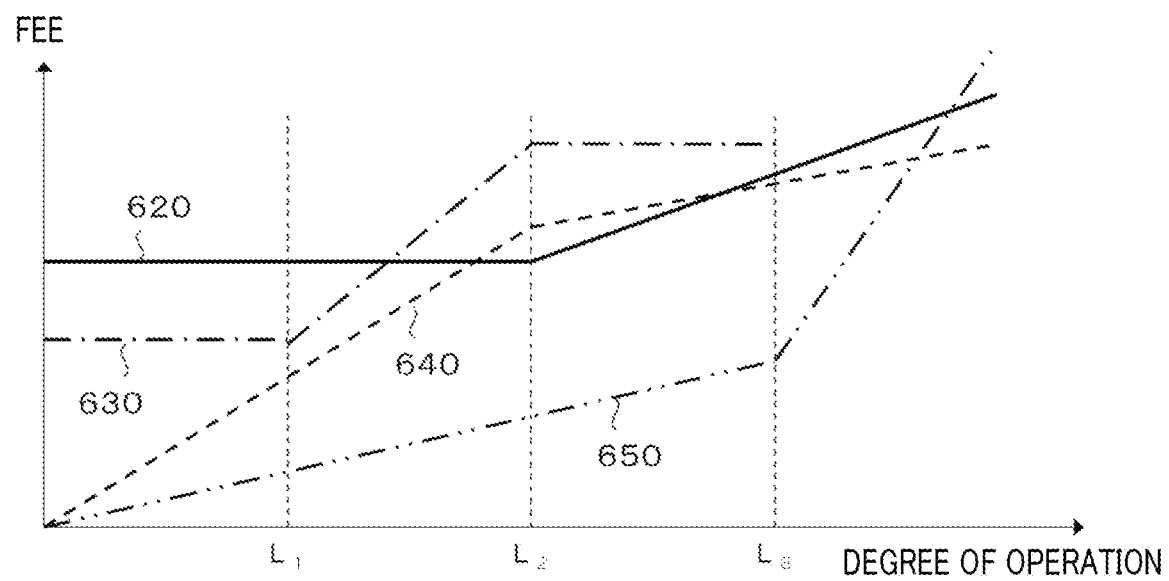
FIG. 6 shows schematically another example of the fee plan.

An example of the fee plan for the fuel cell system 240 is described with reference to FIGS. 5 and 6. FIG. 5 shows an example of a basic fee plan. FIG. 6 shows an example of a fee plan combined with the basic fee plan.

A fee plan 520 shows an example of the fee plan in the flat fee system. According to the fee plan 520, when the degree of operation of the fuel cell system 240 is equal to or less than $L_3$, the usage fee of the fuel cell system 240 is kept constant, irrespective of the degree of operation of the fuel cell system 240. In the present embodiment, when the degree of operation of the fuel cell system 240 exceeds $L_3$, the output of the fuel cell system 240 is limited. According to one embodiment, the upper limit of the output of the fuel cell system 240 is set to a value smaller than a rated output. According to another embodiment, the upper limit of the output rate of the fuel cell system 240 is set to a value smaller than a rated output rate. Thereby, the fuel cell system 240 is suppressed from being deteriorated beyond initial assumption.

In the present embodiment, the fee plan in the flat fee system has been described with reference to the example where when the degree of operation of the fuel cell system 240 exceeds $L_3$, the output of the fuel cell system 240 is limited. However, the fee plan in the flat fee system is not limited to the present embodiment. In another embodiment, the degree of operation of the fuel cell system 240 may not be limited.

A fee plan 530 shows an example of a stepwise fee plan in the flat fee system. The fee plan 530 is different from the fee plan 520, in that when the degree of operation of the fuel cell system 240 exceeds $L_1$ and $L_2$, the usage fee of the fuel cell system 240 increases stepwise. The fee plan 530 may have similar configurations to the fee plan 520, regarding features other than the above difference.

A fee plan 540 shows an example of the fee plan in the measured fee system. In the fee plan 540, the usage fee of the fuel cell system 240 increases proportional to the degree of operation of the fuel cell system 240. In the present embodiment, when the degree of operation of the fuel cell system 240 is 0, the fee is also set to 0. However, the fee plan in the measured fee system is not limited to the present embodiment. In another embodiment, even when the degree of operation of the fuel cell system 240 is 0, a fee may occur as the basic fee.

A fee plan 620 shows an example of a combination of the flat fee system and the measured fee system. According to the fee plan 620, when the degree of operation of the fuel cell system 240 is equal to or less than $L_2$, the usage fee of the fuel cell system 240 is kept constant, irrespective of the degree of operation of the fuel cell system 240. On the other hand, when the degree of operation of the fuel cell system 240 exceeds $L_2$, the usage fee of the fuel cell system 240 increases proportional to the degree of operation of the fuel cell system 240.

A fee plan 630 shows an example of a combination of the stepwise flat fee system and the measured fee system. According to the fee plan 630, when the degree of operation of the fuel cell system 240 is equal to or less than $L_1$, the usage fee of the fuel cell system 240 is kept constant, irrespective of the degree of operation of the fuel cell system 240. When the degree of operation of the fuel cell system 240 exceeds $L_1$ and is equal to or less than $L_2$, the usage fee of the fuel cell system 240 increases proportional to the degree of operation of the fuel cell system 240. Also, when the degree of operation of the fuel cell system 240 exceeds $L_2$ and is equal to or less than $L_3$, the usage fee of the fuel cell system 240 is kept constant, irrespective of the degree of operation of the fuel cell system 240.

A fee plan 640 shows an example of a combination of a plurality of measured fee systems having different proportional coefficients. According to the fee plan 640, the proportional coefficient of a fee with respect to the degree of operation changes between when the degree of operation of the fuel cell system 240 is equal to or less than $L_2$ and when the degree of operation of the fuel cell system 240 exceeds $L_2$. Thereby, a shape of the fee plan 640 is convex upward.

A fee plan 650 shows an example of a combination of the plurality of measured fee systems having different proportional coefficients. According to the fee plan 650, the proportional coefficient of a fee with respect to the degree of operation changes between when the degree of operation of the fuel cell system 240 is equal to or less than $L_3$ and when the degree of operation of the fuel cell system 240 exceeds $L_3$. Thereby, a shape of the fee plan 650 is convex downward.

Figure 7:
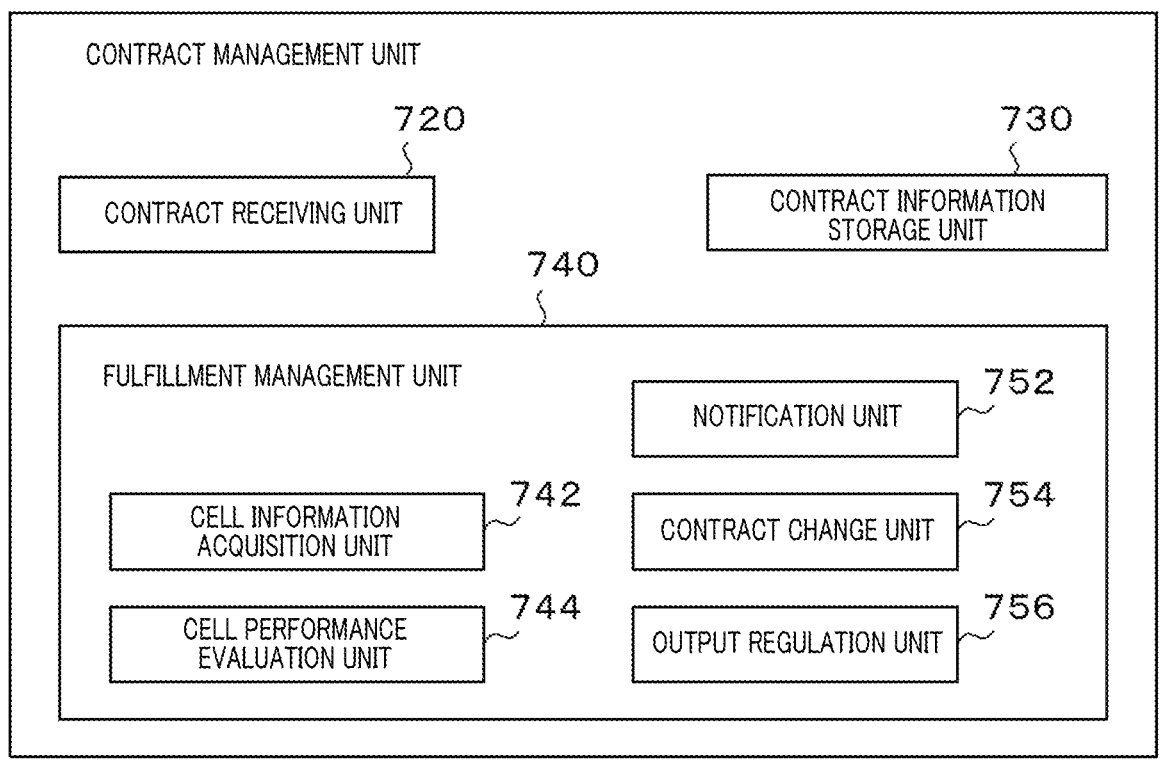
FIG. 7 shows schematically an example of an internal configuration of a contract management unit 144.

FIG. 7 shows schematically an example of an internal configuration of the contract management unit 144. In the present embodiment, the contract management unit 144 includes a contract receiving unit 720, a contract information storage unit 730, and a fulfillment management unit 740. The fulfillment management unit 740 includes, for example, a cell information acquisition unit 742, a cell performance evaluation unit 744, a notification unit 752, a contract change unit 754, and an output regulation unit 756.

In the present embodiment, the contract receiving unit 720, the contract information storage unit 730, and the fulfillment management unit 740 are provided. The fulfillment management unit 740 includes, for example, a cell information acquisition unit 742, a cell performance evaluation unit 744, a notification unit 752, a contract change unit 754, and an output regulation unit 756.

In the present embodiment, the contract receiving unit 720 acquires, from the facility management server 130, information indicating that the transportation business operator 102 wants to conclude a supply contract on the fuel cell system 240, based on the specification and the fee plan for the fuel cell system 240 presented by the planning unit 142. The contract receiving unit 720 stores information indicative of the specification and the fee plan for the fuel cell system 240 in the contract information storage unit 730, as the content of the contract.

In the present embodiment, the contract information storage unit 730 associates and stores identification information of the fuel cell system 240 and information indicative of a content of a contract each other, for each of one or more fuel cell systems 240. The contract information storage unit 730 may also associate and store at least one of identification information of the fuel cell system 240, identification information of the vehicle 110 on which the fuel cell system 240 is mounted and identification information of the transportation business operator 102 and information indicative of a content of a contract each other, for each of one or more fuel cell systems 240.

In the present embodiment, the fulfillment management unit 740 manages fulfilment of a contract on each of one or more fuel cell systems 240. For example, the fulfillment management unit 740 manages a progress state of deterioration in each of one or more fuel cell systems 240. The fulfillment management unit 740 may also manage a payment situation of the usage fee of each of one or more fuel cell systems 240. The fulfillment management unit 740 may also manage a collection situation of the fuel cell system 240 whose contract period has expired.

In the present embodiment, the cell information acquisition unit 742 acquires, from the facility management server 130, information (which may also be referred to as state information) indicative of a state of the fuel cell system 240 mounted on the vehicle 110. As the state information, ON/OFF, a temperature, an output electric power, an output voltage, an output current, an output rate, an amount of power generation per unit time, a remaining amount of fuel, a remaining capacity of a battery and the like of the fuel cell system 240 are exemplified. The cell information acquisition unit 742 may acquire the state information of the fuel cell system 240 in association with time. The cell information acquisition unit 742 outputs the state information of the fuel cell system 240 to the cell performance evaluation unit 744, for example.

In the present embodiment, the cell performance evaluation unit 744 evaluates the progress state of deterioration in the fuel cell system 240. As the deterioration in the fuel cell system 240, deterioration in power generation performance of the fuel cell system 240, deterioration in the stack 242, and the like are exemplified. The cell performance evaluation unit 744 may also evaluate the progress state of deterioration in the fuel cell system 240, based on the state information of the fuel cell system 240 acquired by the cell information acquisition unit 742. For example, the cell performance evaluation unit 744 evaluates a progress state of deterioration in performance of the fuel cell system 240 or a progress state of deterioration in constitutional member of the fuel cell system 240 by comparing at least one of (i) variation in temperature of the fuel cell system 240 under power generation, (ii) a relation of the output voltage and a transition thereof with respect to the output current of the fuel cell system 240 under power generation, and (iii) a voltage of the fuel cell system 240 and a transition thereof during fuel cell stop processing with a corresponding reference.

In the present embodiment, the notification unit 752 can notify, to the transportation business operator 102, information indicating that the deterioration in the fuel cell system 240 is progressed more than expected or information indicating that the deterioration in the fuel cell system 240 is not progressed more than expected. For example, when a difference between the progress state of deterioration in the fuel cell system 240 evaluated by the cell performance evaluation unit 744 and the progress state of deterioration based on the deterioration characteristic of the fuel cell system 240 estimated by the deterioration simulator 436 when determining the fee plan for the fuel cell system 240 exceeds a predetermined degree, the notification unit 752 transmits, to the facility management server 130, the information indicating that the deterioration in the fuel cell system 240 is progressed more than expected or the information indicating that the deterioration in the fuel cell system 240 is not progressed more than expected.

In the present embodiment, when the deterioration in the fuel cell system 240 is progressed more than expected or when the deterioration in the fuel cell system 240 is not progressed more than expected, the contract change unit 754 can change the content of the contract on the fuel cell system 240. Specifically, the contract change unit 754 can change the fee plan for the fuel cell system 240.

In one embodiment, when the progress state of deterioration in the fuel cell system 240 evaluated by the cell performance evaluation unit 744 is progressed more than the progress state of deterioration based on the deterioration characteristic of the fuel cell system 240 estimated by the deterioration simulator 436 when determining the fee plan for the fuel cell system 240, the contract change unit 754 can change the content of the contract on the fuel cell system 240. For example, the contract change unit 754 can change the fee plan so that the usage fee of the fuel cell system 240 becomes more expensive.

In another embodiment, when the progress state of deterioration in the fuel cell system 240 evaluated by the cell performance evaluation unit 744 is not progressed more than the progress state of deterioration based on the deterioration characteristic of the fuel cell system 240 estimated by the deterioration simulator 436 when determining the fee plan for the fuel cell system 240, the contract change unit 754 can change the content of the contract on the fuel cell system 240. For example, the contract change unit 754 can change the fee plan so that the usage fee of the fuel cell system 240 becomes cheaper.

In the meantime, when the deterioration in the fuel cell system 240 evaluated by the cell performance evaluation unit 744 is progressed in excess of a predetermined degree, as compared to the progress state of deterioration based on the deterioration characteristic, the contract change unit 754 may determine that the progress state of deterioration in the fuel cell system 240 evaluated by the cell performance evaluation unit 744 is progressed more than the progress state of deterioration based on the deterioration characteristic. When the deterioration in the fuel cell system 240 evaluated by the cell performance evaluation unit 744 is suppressed in excess of a predetermined degree, as compared to the progress state of deterioration based on the deterioration characteristic, the contract change unit 754 may determine that the progress state of deterioration in the fuel cell system 240 evaluated by the cell performance evaluation unit 744 is not progressed more than the progress state of deterioration based on the deterioration characteristic. Also, the progress state of deterioration based on the deterioration characteristic may be calculated based on the deterioration characteristic of the fuel cell system 240 and a current degree of operation of the fuel cell system 240.

In the present embodiment, when the deterioration in the fuel cell system 240 is progressed more than expected or when the deterioration in the fuel cell system 240 is not progressed more than expected, the output regulation unit 756 regulates the output of the fuel cell system 240. Specifically, the output regulation unit 756 transmits a command for regulating the output of the fuel cell system 240 to the vehicle 110. The output regulation unit 756 may transmit the command to the vehicle 110 via the facility management server 130.

In one embodiment, when the progress state of deterioration in the fuel cell system 240 evaluated by the cell performance evaluation unit 744 is progressed more than the progress state of deterioration based on the deterioration characteristic of the fuel cell system 240 estimated by the deterioration simulator 436 when determining the fee plan for the fuel cell system 240, the output regulation unit 756 regulates the output of the fuel cell system 240.

Specifically, the output regulation unit 756 determines to limit at least one of the output range and the output rate of the fuel cell system 240. The output regulation unit 756 may determine to limit at least one of the output range and the output rate of the fuel cell system 240 by limiting an amount of supply of at least one of fuel and oxidizer in the fuel cell system 240. Also, the output regulation unit 756 transmits, to the vehicle 110, a command for limiting at least one of the output range and the output rate of the fuel cell system 240.

In another embodiment, when the progress state of deterioration in the fuel cell system 240 evaluated by the cell performance evaluation unit 744 is not progressed more than the progress state of deterioration based on the deterioration characteristic of the fuel cell system 240 estimated by the deterioration simulator 436 when determining the fee plan for the fuel cell system 240, the output regulation unit 756 regulates the output of the fuel cell system 240.

Specifically, the output regulation unit 756 determines to expand at least one of the output range and the output rate of the fuel cell system 240. The output regulation unit 756 may determine to expand at least one of the output range and the output rate of the fuel cell system 240 by expanding an amount of supply of at least one of fuel and oxidizer in the fuel cell system 240. Also, the output regulation unit 756 transmits, to the vehicle 110, a command for expanding at least one of the output range and the output rate of the fuel cell system 240.

In the meantime, when the deterioration in the fuel cell system 240 evaluated by the cell performance evaluation unit 744 is progressed in excess of a predetermined degree, as compared to the progress state of deterioration based on the deterioration characteristic, the output regulation unit 756 may determine that the progress state of deterioration in the fuel cell system 240 evaluated by the cell performance evaluation unit 744 is progressed more than the progress state of deterioration based on the deterioration characteristic. When the deterioration in the fuel cell system 240 evaluated by the cell performance evaluation unit 744 is suppressed in excess of a predetermined degree, as compared to the progress state of deterioration based on the deterioration characteristic, the output regulation unit 756 may determine that the progress state of deterioration in the fuel cell system 240 evaluated by the cell performance evaluation unit 744 is not progressed more than the progress state of deterioration based on the deterioration characteristic.

As described above, the fee plan for the fuel cell system 240 is determined based on the deterioration characteristic of the fuel cell system 240. Also, the deterioration characteristic of the fuel cell system 240 is determined based on the requirement specification declared by the transportation business operator 102. However, when the fuel cell system 240 is used under conditions different from the requirement specification over a relatively long period, the deterioration in the fuel cell system 240 is progressed more than expected, so that a premise of the fee plan is not satisfied.

According to the present embodiment, the progress state of deterioration in the fuel cell system 240 is evaluated at any timing or periodically. When the deterioration in the fuel cell system 240 is progressed more than expected, (i) the output of the fuel cell system 240 is regulated to suppress the deterioration in the fuel cell system 240 or (ii) the fee setting of the fee plan for the fuel cell system 240 is changed. Thereby, even when the fuel cell system 240 is used under conditions different from the requirement specification, the reduction in the residual value of the fuel cell system 240 can be equally shared between the transportation business operator 102 and the fuel cell supplier 104.

The cell information acquisition unit 742 may also be an example of the state acquisition unit. The cell performance evaluation unit 744 may also be an example of the deterioration evaluation unit. The contract change unit 754 may also be an example of the first change unit and the second change unit. The output regulation unit 756 may also be an example of the limit unit and the expansion unit.

Figure 8:
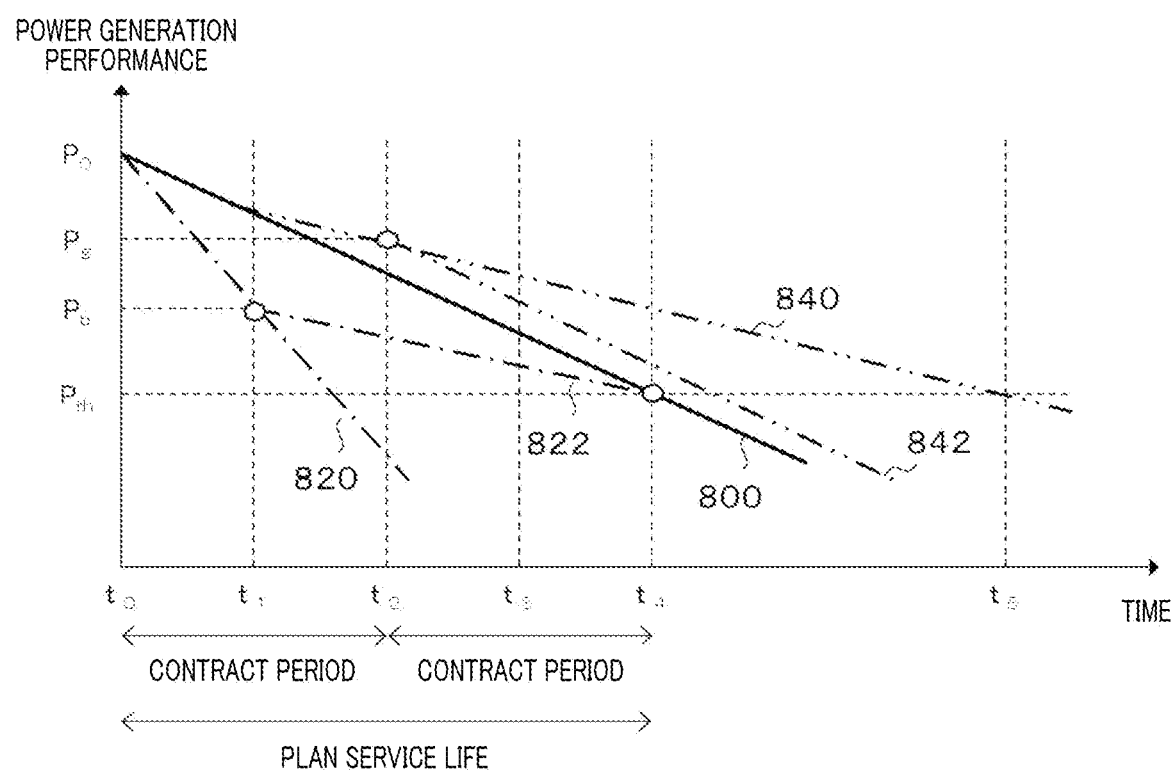
FIG. 8 shows schematically an example of progress of deterioration in a fuel cell system 240.

FIG. 8 shows schematically an example of progress of deterioration in the fuel cell system 240. In the embodiment shown in FIG. 8, an example of the progress of deterioration in the fuel cell system 240 is described with reference to an example where as the deterioration in the fuel cell system 240 is progressed, the power generation performance of the fuel cell system 240 is lowered.

FIG. 8 shows a relation between elapse time[h] from time $t_0$ and the power generation performance of the fuel cell system 240. The elapse time from time $t_0$ may also be an example of the degree of operation of the fuel cell system 240. As the power generation performance of the fuel cell system 240, temperature dependence of an output, a magnitude of an output at a specific temperature, a relation of the output voltage to the output current during a power generation operation, a drop characteristic (for example, a reciprocal of drop transition of a voltage) of a voltage during a stop operation, and the like are exemplified.

In FIG. 8, a line 800 indicates the deterioration characteristic of the fuel cell system 240 estimated by the deterioration simulator 436 when determining the fee plan for the fuel cell system 240. According to the present embodiment, the power generation performance of the fuel cell system 240 at time $t_0$ is $P_O$, and the power generation performance of the fuel cell system 240 at time $t_4$ is $P_{th}$. The period from time $t_0$ to time $t_4$ may be a period (which may also be referred to as a scheduled service life) requested as the service life of the fuel cell system 240.

Subsequently, the operations of the output regulation unit 756, which are performed when the deterioration is progressed more than the progress state of deterioration based on the deterioration characteristic of the fuel cell system 240 estimated by the deterioration simulator 436 when determining the fee plan for the fuel cell system 240, are described using a line 820 and a line 822. For example, at time $t_1$, when the power generation performance of the fuel cell system 240 evaluated by the cell performance evaluation unit 744 is $P_b$, the deterioration characteristic of the fuel cell system 240 is shown with the line 820.

In this case, the deterioration in the fuel cell system 240 evaluated by the cell performance evaluation unit 744 is progressed in excess of a predetermined degree, as compared to the progress state of deterioration based on the deterioration characteristic shown with the line 800, so that the output regulation unit 756 determines to limit at least one of the output range and the output rate of the fuel cell system 240. For example, the upper limit value of the output is set smaller than the current state, the lower limit value of the output is set greater than the current state or the upper limit value of the output rate is set smaller than the current state.

The output regulation unit 756 determines to limit at least one of the output range and the output rate of the fuel cell system 240 so that the power generation performance of the fuel cell system 240 is equal to or greater than $P_{th}$ at time $t_4$, for example. The output regulation unit 756 may also determine to limit at least one of the output range and the output rate of the fuel cell system 240 so that a difference between the power generation performance of the fuel cell system 240 and $P_{th}$ is within a predetermined range at time $t_4$. When at least one of the output range and the output rate of the fuel cell system 240 is limited, it is expected that the deterioration characteristic of the fuel cell system 240 changes from the line 820 to the line 822.

Subsequently, the operations of the output regulation unit 756, which are performed when the deterioration is not progressed more than the progress state of deterioration based on the deterioration characteristic of the fuel cell system 240 estimated by the deterioration simulator 436 when determining the fee plan for the fuel cell system 240, are described using a line 840 and a line 842. For example, at time $t_2$, when the power generation performance of the fuel cell system 240 evaluated by the cell performance evaluation unit 744 is $P_g$, the deterioration characteristic of the fuel cell system 240 is shown with the line 840.

In this case, it is expected that a time, at which the deterioration in the fuel cell system 240 evaluated by the cell performance evaluation unit 744 is suppressed in excess of a predetermined degree, as compared to the progress state of deterioration based on the deterioration characteristic shown with the line 800 and the power generation performance of the fuel cell system 240 becomes equal to $P_{th}$, is time $t_5$. In this case, the output regulation unit 756 may determine to expand at least one of the output range and the output rate of the fuel cell system 240. For example, the upper limit value of the output is set larger than the current state, the lower limit value of the output is set smaller than the current state or the upper limit value of the output rate is set larger than the current state.

The output regulation unit 756 determines to expand at least one of the output range and the output rate of the fuel cell system 240 so that the power generation performance of the fuel cell system 240 is (i) equal to $P_{th}$ or (ii) greater than $P_{th}$ and becomes smaller than the power generation performance when the fuel cell system 240 is deteriorated along the line 840 at time $t_4$, for example. When at least one of the output range and the output rate of the fuel cell system 240 is expanded, it is expected that the deterioration characteristic of the fuel cell system 240 changes from the line 840 to the line 842.

In the present embodiment, the cell management server 140 has been described in detail with reference to the example where when the deterioration in the fuel cell system 240 is suppressed more than the initial assumption, the output regulation unit 756 expands at least one of the output range and the output rate of the fuel cell system 240. However, the cell management by the cell management server 140 is not limited to the present embodiment.

In another embodiment, instead of the embodiment where at least one of the output range and the output rate of the fuel cell system 240 is expanded or in addition to the embodiment, the cell management server 140 may determine to update the use contract on the fuel cell system 240 or to extend the contract period of the use contract, even after time $t_4$. In this case, the cell management server 140 may set the usage fee from time $t_4$ to time $t_5$ smaller than the usage fee up to time $t_4$. The cell management server 140 may also determine a new usage fee, taking into account the residual value of the fuel cell system 240. In addition to the cell management server 140 expanding at least one of the output range and the output rate of the fuel cell system 240, when it is scheduled to update the use contract on the fuel cell system 240 or to extend the contract period of the use contract even after time $t_4$, the cell management server 140 may determine at least one of the output range and the output rate of the fuel cell system 240 so that an expanded state of at least one of the output range and the output rate of the fuel cell system 240 is smaller, as compared to a case where it is expected that the use contract on the fuel cell system 240 will terminate at time $t_4$.

In yet another embodiment, the cell management server 140 may also set the fuel cell system 240 as a target of other use contract after time $t_4$. The other use contract may be a use contract that is newly concluded with the current user or another use contract that is newly concluded with a user different from the current user. In this case, the cell management server 140 may set the usage fee from time $t_4$ to time $t_5$ smaller than the usage fee up to time $t_4$. The cell management server 140 may also determine a new usage fee, taking into account the residual value of the fuel cell system 240.

Figure 9:
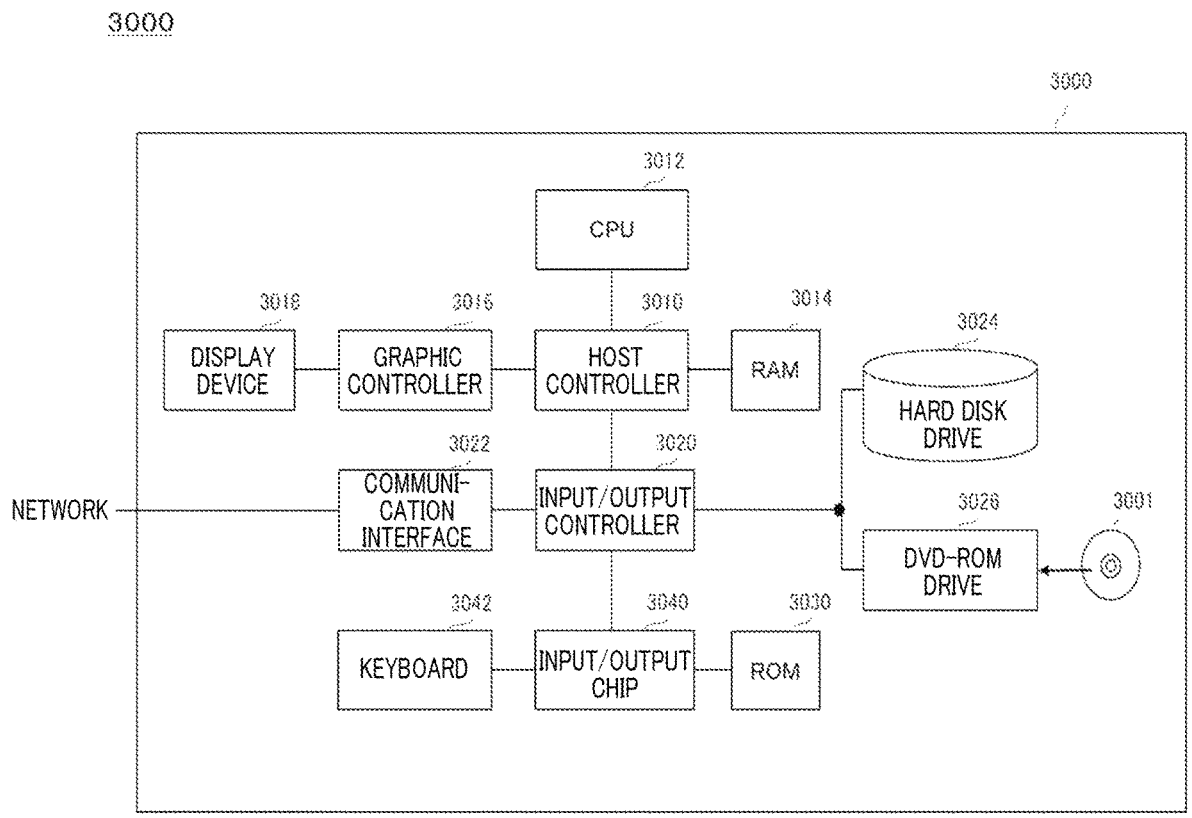
FIG. 9 shows schematically an example of a system configuration of a computer 3000.

FIG. 9 shows an example of a computer 3000 in which a plurality of aspects of the present invention may be implemented entirely or partially. Some of the management system 100 may be implemented by the computer 3000. For example, at least one of the vehicle control unit 112, the facility management server 130, the cell management server 140 and the controller 260 is implemented by the computer 3000.

A program that is installed in the computer 3000 can cause the computer 3000 to function as one or more "sections" in an operation or an apparatus associated with the embodiment of the present invention, or cause the computer 3000 to perform the operation or the one or more sections thereof, and/or cause the computer 3000 to perform processes of the embodiment of the present invention or steps thereof. Such a program may be performed by a CPU 3012 so as to cause the computer 3000 to perform certain operations associated with some or all of the blocks of flowcharts and block diagrams described herein.

The computer 3000 in accordance with the present embodiment includes a CPU 3012, a RAM 3014, a graphic controller 3016, and a display device 3018, which are mutually connected by a host controller 3010. The computer 3000 also includes input/output units such as a communication interface 3022, a hard disk drive 3024, a DVD-ROM drive 3026 and an IC card drive, which are connected to the host controller 3010 via an input/output controller 3020. The computer also includes legacy input/output units such as a ROM 3030 and a keyboard 3042, which are connected to the input/output controller 3020 via an input/output chip 3040.

The CPU 3012 operates according to programs stored in the ROM 3030 and the RAM 3014, thereby controlling each unit. The graphic controller 3016 obtains image data generated by the CPU 3012 on a frame buffer or the like provided in the RAM 3014 or in itself, and causes the image data to be displayed on a display device 3018.

The communication interface 3022 performs communication with other electronic devices via a network. The hard disk drive 3024 stores programs and data that are used by the CPU 3012 within the computer 3000. The DVD-ROM drive 3026 reads the programs or the data from the DVD-ROM 3001, and provides the hard disk drive 3024 with the programs or the data via the RAM 3014. The IC card drive reads programs and data from an IC card, and/or writes programs and data into the IC card.

The ROM 3030 stores therein a boot program or the like that is performed by the computer 3000 at the time of activation, and/or a program depending on the hardware of the computer 3000. The input/output chip 3040 may also connect various input/output units to the input/output controller 3020 via a parallel port, a serial port, a keyboard port, a mouse port or the like.

A program is provided by computer readable media such as the DVD-ROM 3001 or the IC card. The program is read from the computer readable media, installed into the hard disk drive 3024, RAM 3014, or ROM 3030, which are also examples of computer readable media, and performed by the CPU 3012. The information processing described in these programs is read into the computer 3000, resulting in cooperation between a program and the above-mentioned various types of hardware resources. An apparatus or method may be constituted by realizing the operation or processing of information in accordance with the usage of the computer 3000.

For example, when communication is performed between the computer 3000 and an external device, the CPU 3012 may perform a communication program loaded onto the RAM 3014 to instruct communication processing to the communication interface 3022, based on the processing described in the communication program. The communication interface 3022, under control of the CPU 3012, reads transmission data stored on a transmission buffer region provided in a recording medium such as the RAM 3014, the hard disk drive 3024, the DVD-ROM 3001, or the IC card, and transmits the read transmission data to a network or writes reception data received from a network into a reception buffer region or the like provided on the recording medium.

In addition, the CPU 3012 may cause all or a necessary portion of a file or a database to be read into the RAM 3014, the file or the database having been stored in an external recording medium such as the hard disk drive 3024, the DVD-ROM drive 3026 (DVD-ROM 3001), the IC card, etc., and perform various types of processing on the data on the RAM 3014. The CPU 3012 may then write back the processed data to the external recording medium.

Various types of information, such as various types of programs, data, tables, and databases, may be stored in the recording medium to undergo information processing. The CPU 3012 may perform various types of processing on the data read from the RAM 3014, which includes various types of operations, processing of information, condition judging, conditional branch, unconditional branch, search/replace of information, etc., as described throughout this disclosure and designated by an instruction sequence of programs, and writes the result back to the RAM 3014. In addition, the CPU 3012 may search for information in a file, a database, etc., in the recording medium. For example, when a plurality of entries, each having an attribute value of a first attribute associated with an attribute value of a second attribute, are stored in the recording medium, the CPU 3012 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 3000. In addition, a recording medium such as a hard disk or a RAM provided in a server system connected to a dedicated communication network or the Internet can be used as the computer readable media, thereby providing the program to the computer 3000 via the network.

While the embodiments of the present invention have been described, the technical scope of the invention is not limited to the above described embodiments. It is apparent to persons skilled in the art that various alterations and improvements can be added to the above-described embodiments. Also, the matters described in the specific embodiment can be applied to other embodiments inasmuch as there is no technical inconsistency. It is also apparent from the scope of the claims that the embodiments added with such alterations or improvements can be included in the technical scope of the invention.

The operations, procedures, steps, and stages of each process performed by an apparatus, system, program, and method shown in the billings, embodiments, or diagrams can be performed in any order as long as the order is not indicated by "prior to," "before," or the like and as long as the output from a previous process is not used in a later process. Even if the process flow is described using phrases such as "first" or "next" in the billings, embodiments, or diagrams, it does not necessarily mean that the process must be performed in this order.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY® disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA®, C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., to execute the computer-readable instructions to create means for performing operations specified in the flowcharts or block diagrams. Examples of the processor include a computer processor, a processing unit, a microprocessor, a digital signal processor, a controller, a microcontroller, and the like.

EXPLANATION OF REFERENCES

10: communication network, 100: management system, 102: transportation business operator, 104: fuel cell supplier, 110: vehicle, 112: vehicle control unit, 114: power supply unit, 116: sense unit, 120: hydrogen station, 122: hydrogen generation apparatus, 124: hydrogen storage apparatus, 130 the facility management server, 140: cell management server, 142: planning unit, 144: contract management unit, 222: drive control unit, 224: power supply control unit, 226: communication control unit, 228: monitoring unit, 240: fuel cell system, 242: stack, 244: auxiliary machine, 246: storage cell, 248: hydrogen tank, 260: controller, 262: operation control unit, 264: mode switching unit, 322: input/output unit, 324: facility management unit, 326: communication unit, 410: request receiving unit, 420: fuel cell planning unit, 430 the tentative calculation unit, 432: route information acquisition unit, 434: output simulator, 436: deterioration simulator, 438: fuel economy simulator, 440: fee plan planning unit, 450: hydrogen station planning unit, 460: storage unit, 462: the planning reference storage unit, 464: cost storage unit, 466: fee plan storage unit, 520: fee plan, 530: fee plan, 540: fee plan, 620: fee plan, 630: fee plan, 640: fee plan, 650: fee plan, 720: contract receiving unit, 730: contract information storage unit, 740: fulfillment management unit, 742: cell information acquisition unit, 744: cell performance evaluation unit, 752: notification unit, 754: contract change unit, 756: output regulation unit, 800: line, 820: line, 822: line, 840: line, 842: line, 3000: computer, 3001: DVD-ROM, 3010: host controller, 3012: CPU, 3014: RAM, 3016: graphic controller, 3018: display device, 3020: input/output controller, 3022: communication interface, 3024: hard disk drive, 3026: DVD-ROM drive, 3030: ROM, 3040: input/output chip, 3042: keyboard

What is claimed is:

1. An information processing system comprising:
a requirement specification acquisition unit for acquiring requirement specification information indicative of a content of a requirement specification relating to a fuel cell, the fuel cell being mounted on an electric device that is a moving body moving by using electric power;
a moving route acquisition unit for acquiring moving route information indicative of a content of a plan relating to a moving route of the moving body;
a deterioration estimation unit for estimating a deterioration characteristic of the fuel cell, based on the content of the plan indicated in the moving route information;
a fee plan determination unit for determining a fee plan for determining a usage fee of the fuel cell, based on the requirement specification indicated by the requirement specification information and the deterioration characteristic of the fuel cell estimated by the deterioration estimation unit;
a state acquisition unit for acquiring state information indicative of a state of the fuel cell mounted on the moving body;
a deterioration evaluation unit for evaluating a progress state of deterioration in the fuel cell, based on the state information; and
a first change unit for changing the fee plan when the progress state of the deterioration in the fuel cell evaluated by the deterioration evaluation unit is progressed more than a progress state of deterioration based on the deterioration characteristic of the fuel cell estimated by the deterioration estimation unit.

2. The information processing system according to claim 1, wherein
the fee plan includes information indicative of a correspondence between a degree of operation of the fuel cell and the usage fee of the fuel cell.

3. The information processing system according to claim 2, wherein
the requirement specification information includes information about at least one selected from a group consisting of (i) a dimension, a shape, a mass, a rated output, a rated voltage, a rated current, a rated output rate, a highest usable temperature and a lowest usable temperature of the fuel cell, (ii) a service life and a use aspect of the fuel cell, and (iii) a use, a type, a rated power consumption, a service life and a use aspect of an electric device on which the fuel cell is mounted.

4. The information processing system according to claim 3, wherein
the requirement specification information includes:
information indicative of a condition required for the service life of the fuel cell, and
information indicative of at least one of the use and the type of the electric device.

5. The information processing system according to claim 1, wherein
the fee plan includes information indicative of a correspondence between (a) a degree of operation of the fuel cell during a period defined in a use contract that is a contract relating to supplying or using the fuel cell or a degree of operation of the fuel cell during a unit period relating to calculating the usage fee and (b) the usage fee of the fuel cell.

6. The information processing system according to claim 1, further comprising
an output estimation unit for estimating an output of the fuel cell at one or more positions on the moving route, based on the content of the plan indicated in the moving route information, wherein
the deterioration estimation unit estimates the deterioration characteristic of the fuel cell, based on the output of the fuel cell estimated by the output estimation unit.

7. The information processing system according to claim 6, wherein
the output estimation unit estimates an output and a temperature of the fuel cell at one or more positions on the moving route, and
the deterioration estimation unit estimates the deterioration characteristic of the fuel cell, based on the output and the temperature of the fuel cell estimated by the output estimation unit.

8. The information processing system according to claim 7, wherein
the requirement specification information includes:
(i) information indicative of a condition required for a service life of the fuel cell, and
(ii) at least one of information indicative of a use of the moving body, information indicative of a type of the moving body and information indicative of a statistical value relating to a loaded amount of the moving body and a mass of the moving body,
the output estimation unit estimates the output of the fuel cell at one or more positions on the moving route, based on at least one of the use of the moving body, the type of the moving body, the statistical value relating to the loaded amount of the moving body and the mass of the moving body, and the content of the plan indicated in the moving route information, and
the fee plan determination unit determines the fee plan, based on a progress state of deterioration in the fuel cell at the time when the service life of the fuel cell has elapsed.

9. The information processing system according to claim 8, wherein
the moving route information includes at least one of (i) output data of an operation recording device mounted on a moving body having actually moved on the moving route indicated by the moving route information and (ii) output data of a position estimation device mounted on the moving body having actually moved on the moving route indicated by the moving route information.

10. The information processing system according to claim 5, wherein
the fuel cell is mounted on a moving body moving by using electric power,
the information processing system further comprises:
a moving route acquisition unit for acquiring moving route information indicative of a content of a plan relating to a moving route of the moving body; and
a deterioration estimation unit for estimating a deterioration characteristic of the fuel cell, based on the content of the plan indicated in the moving route information,
the fee plan determination unit determines the fee plan, based on the requirement specification indicated by the requirement specification information and the deterioration characteristic of the fuel cell estimated by the deterioration estimation unit, and
the moving route information includes at least one of (i) output data of an operation recording device mounted on a moving body having actually moved on the moving route indicated by the moving route information and (ii) output data of a position estimation device mounted on the moving body having actually moved on the moving route indicated by the moving route information.

11. The information processing system according to claim 1, further comprising a second change unit for changing the fee plan when the progress state of the deterioration in the fuel cell evaluated by the deterioration evaluation unit is not progressed more than a progress state of deterioration based on the deterioration characteristic of the fuel cell estimated by the deterioration estimation unit.

12. The information processing system according to claim 11, further comprising a limit unit for determining to limit an output range of the fuel cell when a progress state of deterioration in the fuel cell evaluated by the deterioration evaluation unit is progressed more than a progress state of deterioration based on the deterioration characteristic of the fuel cell estimated by the deterioration estimation unit.

13. The information processing system according to claim 12, further comprising an expansion unit for determining to expand an output range of the fuel cell when a progress state of deterioration in the fuel cell evaluated by the deterioration evaluation unit is not progressed more than a progress state of deterioration based on the deterioration characteristic of the fuel cell estimated by the deterioration estimation unit.

* * * * *